US012587774B2

(12) United States Patent
Aurongzeb et al.

(10) Patent No.: US 12,587,774 B2
(45) Date of Patent: Mar. 24, 2026

(54) SYSTEM AND METHOD OF ASSEMBLING A COMPRESSION TRIGGERED HEADSET POWER SAVING SYSTEM FOR AN AUDIO HEADSET

(71) Applicant: Dell Products LP, Round Rock, TX (US)

(72) Inventors: Deeder M. Aurongzeb, Austin, TX (US); Peng Lip Goh, Singapore (SG); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 188 days.

(21) Appl. No.: 18/626,976

(22) Filed: Apr. 4, 2024

(65) Prior Publication Data

US 2025/0317681 A1 Oct. 9, 2025

(51) Int. Cl.
*H04R 1/10* (2006.01)

(52) U.S. Cl.
CPC ......... *H04R 1/1041* (2013.01); *H04R 1/1008* (2013.01); *H04R 1/105* (2013.01); *H04R 1/1075* (2013.01); *H04R 2460/03* (2013.01)

(58) Field of Classification Search
None
See application file for complete search history.

(56) References Cited

U.S. PATENT DOCUMENTS

| | | | |
|---|---|---|---|
| 8,050,444 B2 | 11/2011 | Smith | |
| 8,238,570 B2 | 8/2012 | Johnson, Jr. | |
| 9,445,185 B2 | 9/2016 | Brunner | |
| 2015/0139473 A1 | 5/2015 | Jaynes | |
| 2018/0242859 A1 | 8/2018 | LeBoeuf | |
| 2023/0030946 A1 * | 2/2023 | Warren | H04R 1/1041 |

* cited by examiner

*Primary Examiner* — Duc Nguyen
*Assistant Examiner* — Assad Mohammed
(74) *Attorney, Agent, or Firm* — Prol Intellectual Property Law, PLLC; H. Kenneth Prol

(57) ABSTRACT

A compression triggered headset power saving system for an audio headset comprises a compression sensor cap operatively coupled to a spring switch housed within a compression sensor sleeve to form a compression sensor trigger, such that movement of the compression sensor cap toward the compression sensor sleeve causes the compression sensor cap to electrically contact two pogo electrical contacts and to urge them into contact with separate electrical contact plates, the electrical contact plates mounted to an ear cup plate and operatively coupled to a printed circuit board (PCB) and a speaker, and the compression sensor trigger disposed within an ear cup cushion mounted to the ear cup plate such that movement of the compression sensor cap to engage the pogo electrical contacts occurs under compression of the ear cup cushion to close a circuit to the PCB to trigger providing power to the speaker or other components.

20 Claims, 10 Drawing Sheets

220

PERSPECTIVE VIEW

PERSPECTIVE CUT-AWAY VIEW

PERSPECTIVE CUT-AWAY VIEW

PERSPECTIVE CROSS-SECTIONAL VIEW

660

PERSPECTIVE VIEW

660

PERSPECTIVE VIEW

SYSTEM AND METHOD OF ASSEMBLING A COMPRESSION TRIGGERED HEADSET POWER SAVING SYSTEM FOR AN AUDIO HEADSET

FIELD OF THE DISCLOSURE

The present disclosure generally relates to assembly of an audio headset for an information handling system. More specifically, the present disclosure relates to the assembly of an audio headset that incorporates a compression triggered headset power saving system to conserve power supplied to a speaker or other components of the headset when compression sensor triggers housed within the earcup cushions of the headset indicate that the headset is not in use by a wearer.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices or wireless connectivity to wireless peripheral input/output devices that may also include a wired or wireless audio headset, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
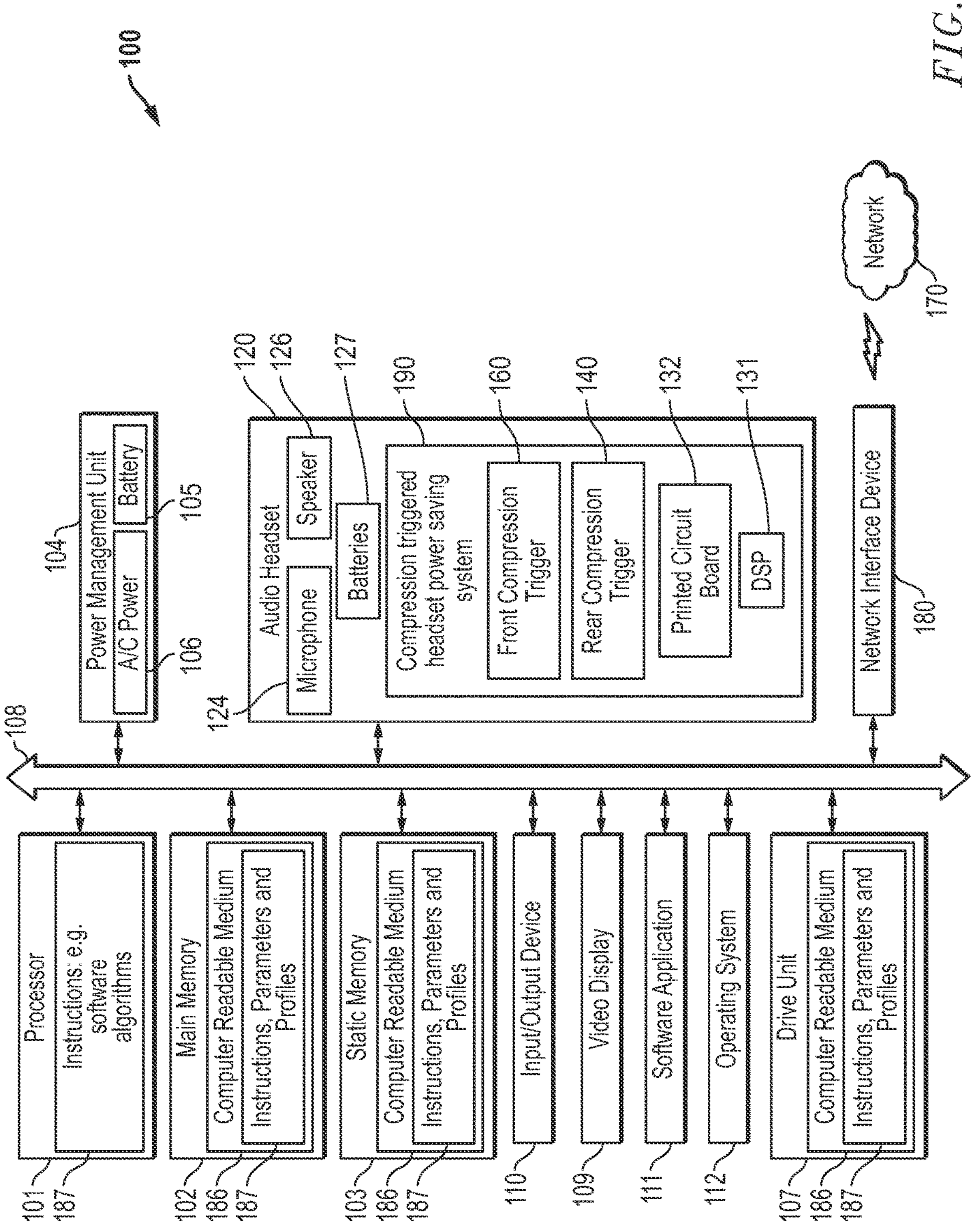
FIG. 1 is a block diagram illustrating an information handling system operatively coupled to audio headset including a compression triggered headset power saving system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Audio headsets such as headphones with cushioned ear cups that surround the ear provide some clamping force pulling the two ear cups together to remain firmly on the wearer's head, and in some cases to decrease audible external noise. Users often remove the headset without turning off the headset, which causes unnecessary power consumption by the audio headset and increases greenhouse gas emissions. Some existing audio headsets overcome this unnecessary power drainage by incorporating a proximity sensor within the earcup assemblies of the audio headsets that can sense when the earcup is in close proximity to a wearer's ear or head. While such proximity sensors prevent some unnecessary power consumption by turning off the headset when such proximity is not detected, the proximity sensor itself consumes power, even when the headset is not worn by the user. A system is needed to detect when a user is not wearing an audio headset and to power down a speaker of the headset and other components when the headset is not in use such that it consumes less power.

The compression triggered headset power saving system in embodiments of the present disclosure address these issues by incorporating one or more compression sensor triggers into the earcup cushions of each earcup in an audio headset to detect when the headset is being worn by a user while consuming less power than a proximity sensor. In embodiments herein, a printed circuit board (PCB) may operate to receive power supplied by a power management unit (PMU) of an operatively coupled information handling system, or by internal batteries, and to supply power to the speaker, microphone, digital signal processor, or other components of an audio headset. The compression triggered headset power saving system incorporated within this audio headset may ensure that such power is supplied to the speaker via the PCB only when one or more compression sensor triggers are placed into electrically conductive contact with the PCB. This may occur, when an earcup cushion for the headset is compressed against the head of ear of a wearer, indicating that the headset is in use by the wearer, and the compression sensor triggers situated within the ear cup cushion are also compressed.

Such compression sensor triggers in embodiments may include a sleeve housing spring biased pogo contacts and a spring switch, which may be operatively coupled to a compression cap. The spring switch or pogo contacts may be biased to push the compression cap away from the sleeve, and the pogo contacts may be biased to remain within the sleeve. Under sufficient compression force on the cap to overcome the spring switch or pogo contact bias, the compression cap may push toward the sleeve, and an electrically conductive inner surface of the cap may come into electrically conductive contact with the electrically conductive pogo contacts housed within the sleeve. These pogo contacts may also push to extend partially beyond the rear edge of the sleeve.

One or more of these compression sensor triggers may be situated within an earcup cushion of an audio headset with the compression cap facing toward the user, between the user's head or car and the sleeve of the compression sensor trigger. When the user places the audio headset over his or her head and the ear cup assembly that includes the ear cup cushion over the user's ear, tension of the headband for the headset may clamp the ear cup assembly and the car cup cushion against the user's ear or head. This may compress the ear cup cushion, and may push the compression sensor trigger cap toward the sleeve of the compression trigger, causing the pogo contacts to extend away from the user, beyond the edge of the compression sensor trigger sleeve, and toward the internal components of the ear cup assembly.

The ear cup assembly may include electrical contact plates and connectors that place the PCB for the headset into electrically conductive contact with the pogo contacts when at least one of the compression sensor triggers are compressed during use by the wearer in such a way. Such electrically conductive contact between the pogo contacts of at least one of the compression sensor trigger and the electrical contact plates and connectors housed within the ear cup assembly may effectively close an electrical circuit between at least one of the compression sensor triggers and the PCB. The compression triggered headset power saving system in embodiments may then allow power to be supplied to the speaker, microphone, or other headset components housed within the ear cup assembly. When this circuit is broken, however, the compression triggered headset power saving system may cease power delivery to the speaker, microphone, or other headset components. Such a simple power switch in embodiments may consume far less power than a conventional proximity sensor.

Upon removal of the headset from the user's head, the ear cup cushion may decompress. In such embodiments, the spring switch or pogo contacts located within the compression sensor trigger may push the compression sensor cap away from the sleeve, allowing the pogo contacts to retract back into the sleeve. This retraction may move the pogo contacts out of electrically conductive contact with the PCB, breaking the circuit required to deliver power to the speaker, microphone, or other headset components. In such a way, the compression triggered headset power saving system incorporating one or more compression sensor triggers into the earcup cushions of each earcup in an audio headset may detect when the headset is being worn by a user while consuming less power than a proximity sensor.

FIG. 1 illustrates an information handling system 100 according to several aspects of the present disclosure. In various embodiments described herein, an audio headset 120 may be operatively coupled to the information handling system 100 such that a speaker 126 emits audible sound generated by the software application 111 or operating system 112 such as during communications using the audio headset 120. A printed circuit board (PCB) 132 in an embodiment may operate to receive power supplied by the power management unit (PMU) 104 or by internal batteries 127, and to supply power to the speaker 126, microphone 124, or other headset components. As described herein, the compression triggered headset power saving system 190 may ensure that such power is supplied to the speaker 126, microphone 124, or other headset components, such as the digital signal processor 131 via the PCB 132 only when a front compression sensor trigger 160 or a rear compression sensor trigger 140, or both are placed into electrically conductive contact with the PCB 132. This may occur in an embodiment, when an earcup cushion for the headset 120 is compressed against the head of car of a wearer, indicating that the headset 120 is in use by the wearer, and the front compression sensor trigger 160 or rear compression sensor trigger 140, or both, as situated within the ear cup cushion, are also compressed. In some embodiments, the audio headset 120 may be a wired headset operatively coupled to the information handling system 100 via a wired connection, such as a universal serial bus (USB) connection. In other embodiments, the audio headset 120 may be a wireless headset operatively coupled to the information handling system 100 via a wireless link established through the network interface device 180. Two compression sensor triggers 140 and 160 are used in case the user wears the audio headset 120 in a way that at least one of the compression sensor triggers 140 or 160 triggers power and helps to ensure detection of the wearer even in varied orientations of the headset 120.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 180, various input and output (I/O) devices 110, an adjustable clamping earcup assembly, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 180, a static memory 103 or drive unit 107, a video display 109, wired or wireless audio headset 120, including PCB 132, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The network interface device 180 may provide connectivity of the information handling system 100 to wireless peripheral devices such as the audio headset 120 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 180 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 180 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHZ bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2A:
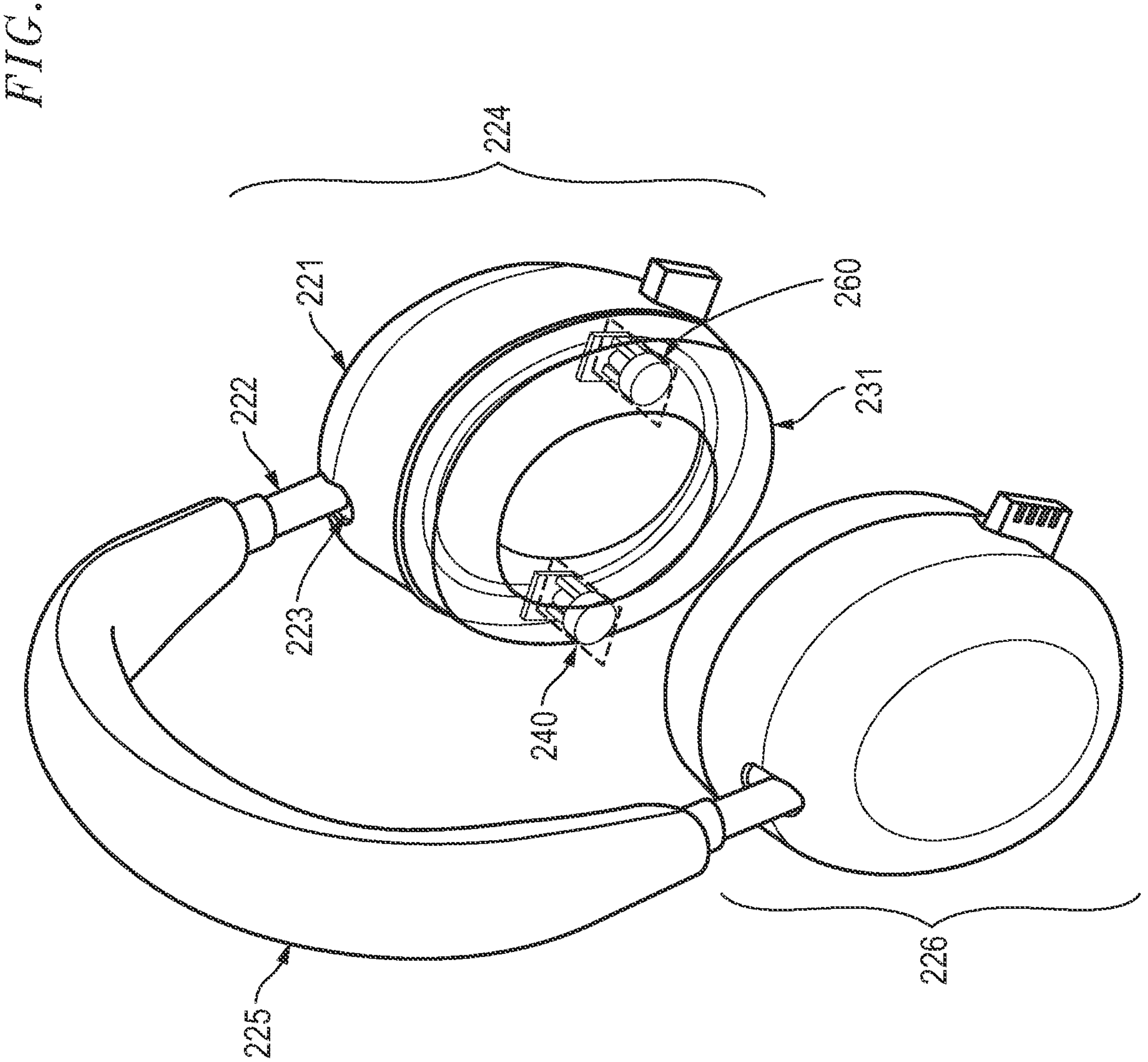
FIG. 2A is a graphical diagram illustrating a perspective view of audio headset including a front compression sensor trigger and a rear compression sensor trigger for conserving power of the headset when not in use by a wearer according to an embodiment of the present disclosure.

FIG. 2A is a graphical diagram illustrating a perspective view of audio headset including a front compression sensor trigger or a rear compression sensor trigger of a compression triggered headset power saving system to conserve power supplied to a speaker, microphone, or other headset components of the headset when not in use by a wearer according to an embodiment of the present disclosure. Front and rear compression sensor triggers 260 and 240, respectively, in an embodiment may be disposed within an ear cup cushion 231 fixed to an ear cup plate such that compression of the cushion 231 when worn by a user causes compression of the front and rear compression sensor triggers 260 and 240, respectively. It is contemplated that the cushion 231 in an embodiment may incorporate any number of such compression sensor triggers, such as 240 and 260 and in any location around the cushion 231 including top, bottom, front, back or any portion of the circumference of the cushion 231. A headband connector 222 may be inserted through an opening 223 within an ear cup cover 221 and the ear cup cover 221 may be operatively coupled to an ear cup base plate on the rear surface of the ear cup cushion 231 to form a first ear cup assembly 224. A second ear cup assembly 226 may also be formed in a similar manner. A tension headband 225 may be attached in an embodiment to the first and second ear cup assemblies 224 and 226, respectively to form a headset 220. A wearer of the headset 220 in an embodiment may place the headband 225 over the wearer's head and first and second ear cup assemblies 224 and 226, respectively over the wearer's ears.

Figure 2B:
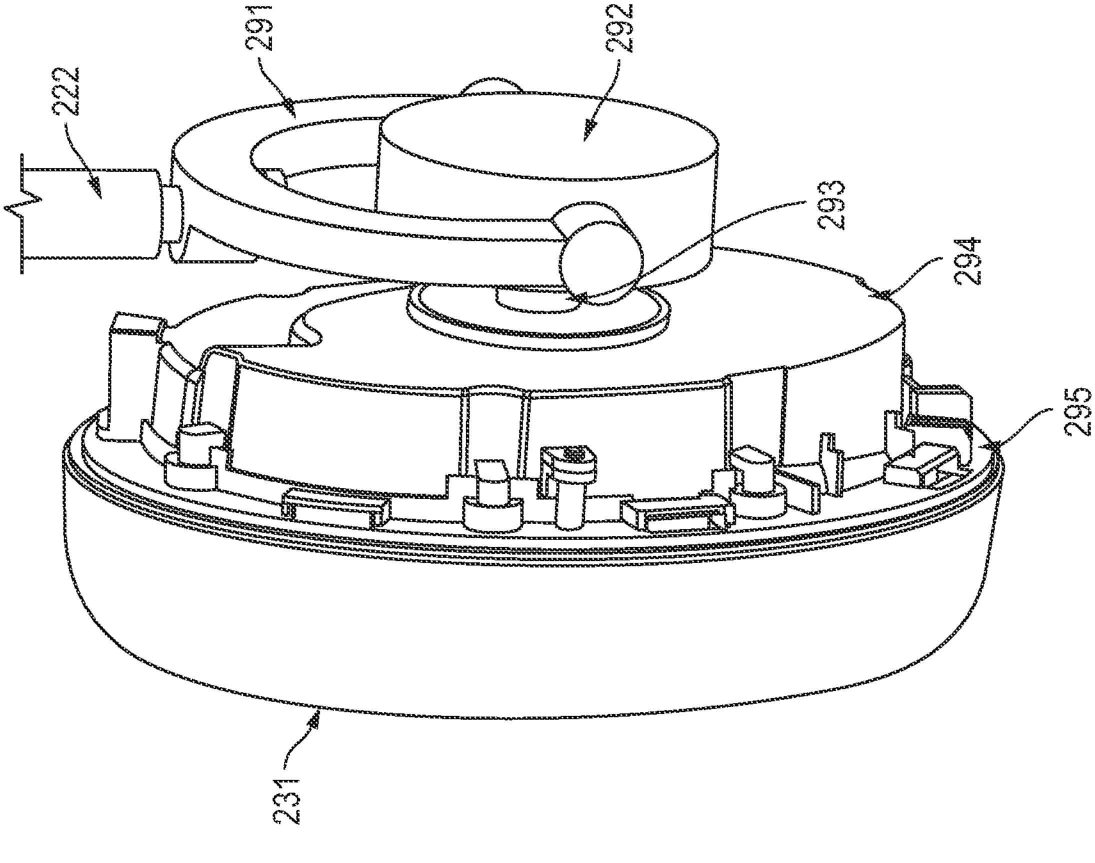
FIG. 2B is a graphical diagram illustrating a front perspective view of an ear cup assembly without an earcup cover incorporating a compression triggered headset power saving system according to an embodiment of the present disclosure.

FIG. 2B is a graphical diagram illustrating a front perspective view of an ear cup assembly of a headset with an ear cup cover removed incorporating a compression triggered headset power saving system to conserve power supplied to a speaker, microphone, or other headset components of the headset when not in use by a wearer according to an embodiment of the present disclosure. A rear surface of an ear cup plate 295 may be operatively coupled in an embodiment to an ear cup sound chamber 294 and a front surface of the ear cup plate 295 may be operatively coupled to an ear cup cushion 231 housing one or more compression sensor triggers for compression triggered electrical connections, as described in greater detail below with respect to FIGS. 3, 4, and 5. An ear cup barrel 292 operatively coupled to the sound chamber 294 via a rod 293 in an embodiment may be operatively coupled to an ear cup rotational tilt clamp 291. Ear cup barrel 292 may be fixed or adjustable and moveable via rod 293 with sound chamber 294 in various embodiments. A headband connector 222 of a clamping headband may be inserted through an opening within an ear cup cover (not shown), such as 221 of FIG. 2A and the ear cup cover may be operatively coupled to the ear cup base plate 295 to form a first ear cup assembly, such as 224 of FIG. 2A.

Figure 3:
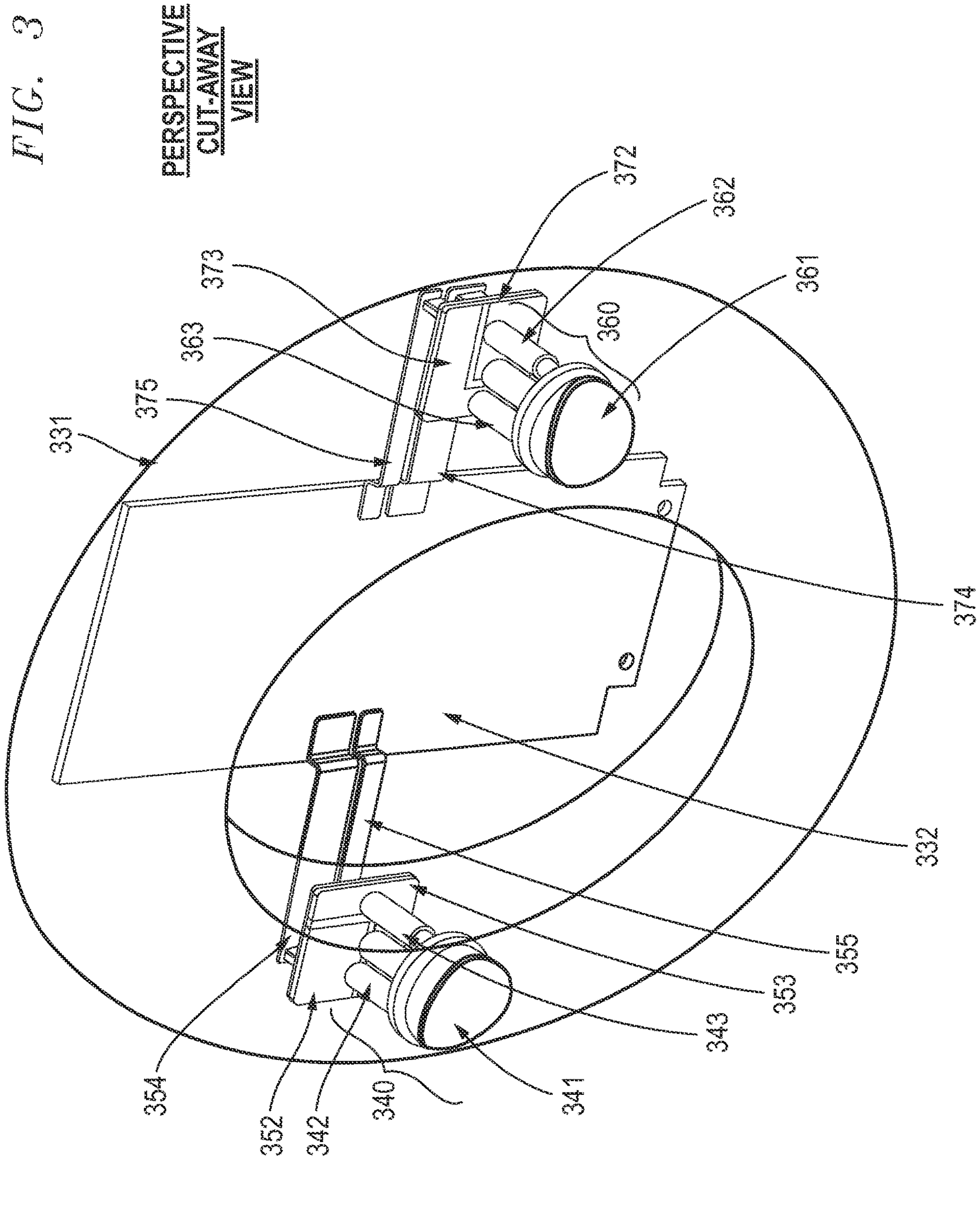
FIG. 3 is a graphical diagram illustrating a perspective view of compression sensor triggers disposed within an ear cup cushion and operatively coupled to a printed circuit board (PCB) according to an embodiment of the present disclosure.

FIG. 3 is a graphical diagram illustrating a perspective view of compression sensor triggers of a compression triggered headset power saving system disposed within an ear cup cushion of a headset and operatively coupled to a printed circuit board (PCB) of the headset according to an embodiment of the present disclosure. A first compression sensor trigger 360 in an embodiment may include two pogo contacts 362 and 363 and a compression sensor cap 361. The pogo contacts 362 and 363 in an embodiment may be comprised of an electrically conductive material, such as copper, and they may be spring-biased to remain within a compression sensor sleeve and out of electrically conductive contact with electrically conductive contact plates 372 and 373.

The compression sensor cap 361 of the first compression sensor trigger 360 in an embodiment may move under compression or decompression of a spring switch situated between the pogo contacts 362 and 363, or the pogo contacts 362 and 363 themselves in embodiments where pogo contacts 362 and 363 may be spring biased, as described in greater detail below with respect to FIGS. 6A and 6B, such that movement of the compression sensor cap 361 toward a compression sensor sleeve housing the pogo contacts 362 and 363 causes an electrically conductive inner surface of the compression sensor cap 361 to come into electrically conductive contact with both pogo contacts 362 and 363, and both pogo contacts 362 and 363 to come into electrically conductive contact with a first front electrically conductive contact plate 372 and a second front electrically conductive contact plate 373, respectively, of the first compression sensor trigger 360.

A second compression sensor trigger 340 in an embodiment may include two pogo contacts 342 and 343 and a compression sensor cap 341. The pogo contacts 342 and 343 in an embodiment may be comprised of an electrically conductive material, such as copper, and they may be spring-biased to remain within a compression sensor sleeve and out of electrically conductive contact with electrically conductive contact plates 352 and 353. The compression sensor cap 341 in an embodiment may move under compression or decompression of a spring switch situated between the pogo contacts 342 and 343, or pogo contacts 342 and 343 themselves in embodiments where pogo contacts 342 and 343 may be spring biased, as described in greater detail below with respect to FIGS. 6A and 6B, such that movement of the compression sensor cap 341 toward a compression sensor sleeve housing the pogo contacts 342 and 343 causes an electrically conductive inner surface of the compression sensor cap 341 to come into electrically conductive contact with both pogo contacts 342 and 343, and both pogo contacts 342 and 343 to come into electrically conductive contact with a first rear electrically conductive contact plate 352 and a second rear electrically conductive contact plate 353, respectively, of the second compression sensor trigger 340.

The electrically conductive contact plates 352, 353, 372, and 373 in various embodiments may comprise any type of electrically conductive material such as copper, for example. The electrically conductive contact plates 352 and 353 of the second compression sensor trigger 340 may be electrically insulated from one another, and the electrically conductive contact plates 372 and 373 of the first compression sensor trigger 360 may be electrically insulated from one another.

A first front electrical contact plate 372 in an embodiment may be operatively coupled to a first front electrically conductive connector 374 and a second front electrical contact plate 373 may be operatively coupled to a second front electrically conductive connector 375 to form a front compression triggered electrical connection with the printed circuit board (PCB) 332 when compressed. A first rear electrical contact plate 352 in an embodiment may be operatively coupled to a first rear electrically conductive connector 354 and a second rear electrical contact plate 353 may be operatively coupled to a second rear electrically conductive connector 355 to form a rear compression triggered electrical connection with PCB 332 when compressed.

A rear compression triggered electrical connection and a front compression triggered electrical connection in an embodiment may be operatively coupled to the printed circuit board (PCB) 332. For example, the first rear electrically conductive connector 354 and the second rear electrically conductive connector 355 of the rear compression sensor trigger 340 in an embodiment may be operatively coupled to the PCB 332 to enable an electrical connection. In an embodiment, the PCB 332 may supply an electrical current to the first rear electrically conductive connector 354, which may deliver electrical current to the first rear electrically conductive contact plate 352. When the rear compression sensor trigger 340 containing the compression sensor cap 341 is compressed and placed in electrically conductive contact with the second rear electrically conductive contact plate 353, this electrical current may be further delivered to the second rear electrically conductive connector 355, and back to the PCB 332, closing an electrical circuit. The PCB 332 in an embodiment may then deliver power or be triggered to deliver power to a speaker, microphone, or other headset component housed within the ear cup housing the ear cup cushion 331. When the rear compression sensor trigger 340 containing the compression sensor cap 341 is not compressed, this electrical circuit may remain open.

A front compression triggered electrical connection of the first compression sensor trigger 360 in an embodiment may be operatively coupled to PCB 332. For example, the first front electrically conductive connector 374 and the second front electrically conductive connector 375 of the front compression triggered electrical connection for the first or front compression sensor trigger 360 in an embodiment may be operatively coupled to the PCB 332. In an embodiment, the PCB 332 may supply an electrical current to the first front electrically conductive connector 374, which may deliver electrical current to the first front electrically conductive contact plate 372. When the front compression sensor trigger 360 containing the compression sensor cap 361 is compressed and placed in electrically conductive contact with the second front electrically conductive contact plate 373, this electrical current may be further delivered to the second front electrically conductive connector 375, and back to the PCB 332, closing an electrical circuit. The PCB 332 in an embodiment may then deliver power to a speaker, microphone, or other headset components housed within the ear cup housing the ear cup cushion 331. In other embodiments, the PCB 332 may only deliver or be triggered to deliver power to the speaker, microphone, or other headset components when both of the compression sensor triggers 340 and 360 are compressed, to close both circuits. When the first compression sensor trigger 360 having the compression sensor cap 361 is not compressed, this electrical circuit may remain open.

The first compression sensor trigger 360 including compression sensor trigger cap 361 and pogo contacts 362 and 363 in an embodiment may be disposed within the ear cup cushion 331 such that compression of the cushion 331 when worn by a user causes compression of the front compression sensor cap 361 and pogo contacts 362 and 363 toward the first and second front electrically conductive plates 372 and 373, and electrically conductive contact between the pogo contacts 362 and 363 and the electrical contact plates 372 and 373, respectively. In an embodiment, the PCB 332 may supply electrical current to the first front electrically conductive connector 374, which may deliver electrical current to the first front electrically conductive contact plate 372. When the first front pogo contact 362 is in electrically conductive contact with the first front electrically conductive contact plate 372 and the electrically conductive inner surface of the compression sensor cap 361, this electrical current may be further delivered to the pogo contact 363 via the electrically conductive inner surface of the compression sensor cap 361. The second front electrically conductive contact plate 373 may be in electrically conductive contact with the pogo contact 363, to receive this electrical current and deliver it to the PCB 332 via the second front electrically conductive connector 375. Thus, compression of the compression sensor cap 361, placing the electrically conductive inner surface of the compression sensor cap 361 into contact with the pogo contacts 362 and 363, and placing the pogo contacts 362 and 363 into electrically conductive contacts with the first and second front electrically conductive contact plates 372 and 373, respectively, may close a circuit between the front, first compression sensor trigger 360 and the PCB 332.

The second compression sensor trigger 340 including compression sensor cap 341 and pogo contacts 342 and 343 in an embodiment may be disposed within the ear cup cushion 331 such that compression of the cushion 331 when worn by a user causes compression of the second, rear compression sensor cap 341 and pogo contacts 342 and 343 toward the first and second rear electrically conductive plates 352 and 353, and electrically conductive contact between the pogo contacts 342 and 343 and the electrical contact plates 352 and 353, respectively. In an embodiment, the PCB 332 may supply an electrical current to the first rear electrically conductive connector 354, which may deliver electrical current to the first rear electrically conductive contact plate 352. When the first rear pogo contact 342 is in electrically conductive contact with the first rear electrically conductive contact plate 352 and the electrically conductive rear surface of the compression sensor cap 341, this electrical current may be further delivered to the pogo contact 343 via the electrically conductive rear surface of the compression sensor cap 341. The second rear electrically conductive contact plate 353 may be in electrically conductive contact with the pogo contact 343, to receive this power and deliver it to the PCB 332 via the second rear electrically conductive connector 355. Thus, compression of the compression sensor cap 341, placing the electrically conductive inner surface of the compression sensor cap 341 into contact with the pogo contacts 342 and 343, and placing the pogo contacts 342 and 343 into electrically conductive contacts with the first and second rear electrically conductive contact plates 352 and 353, respectively, may close a circuit between the rear, second compression sensor trigger 340 and the PCB 332.

The PCB 332 in an embodiment may then deliver power to a speaker, microphone, or other headset components housed within the ear cup housing the ear cup cushion 331.

Figure 4:
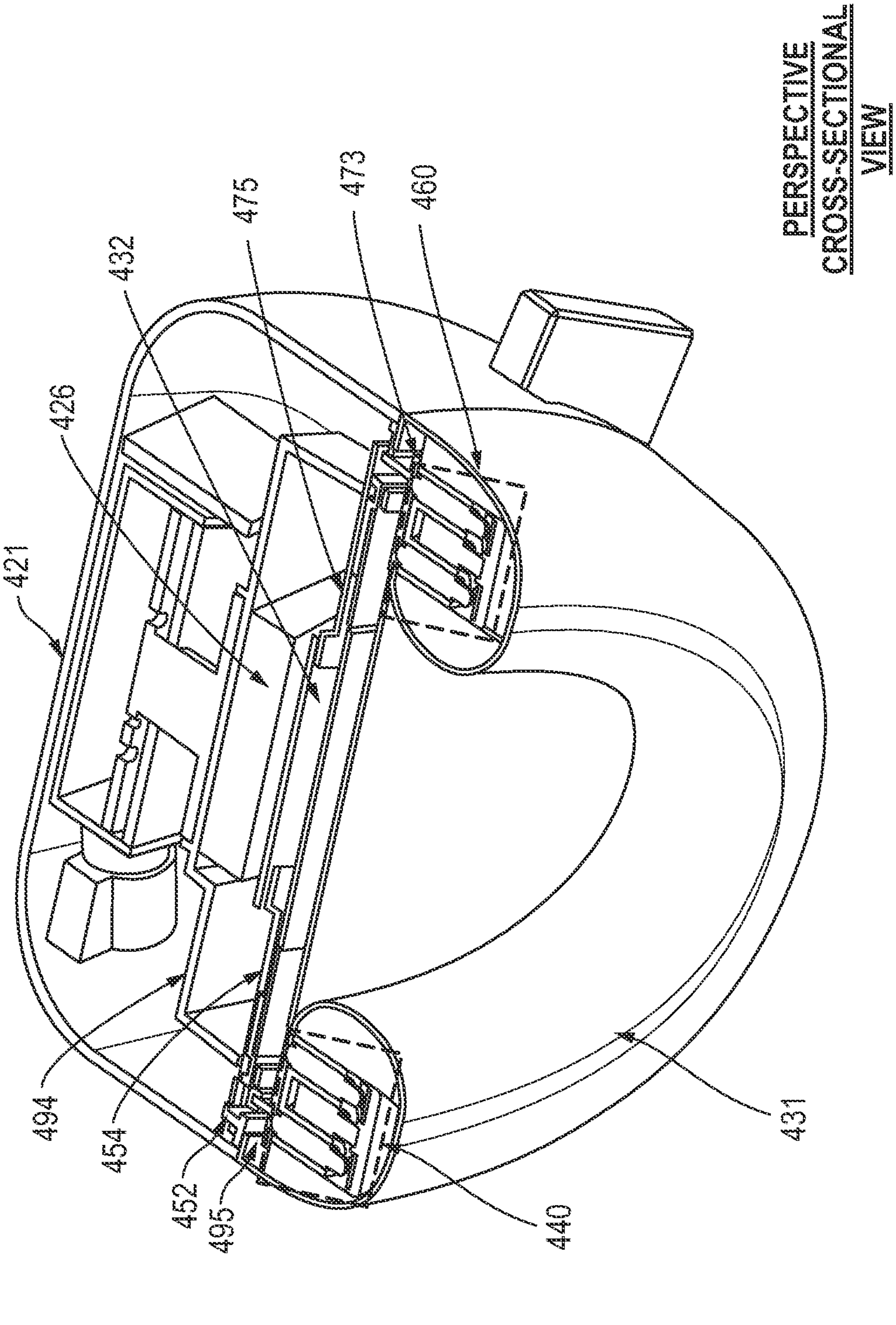
FIG. 4 is a graphical diagram illustrating a cross-sectional perspective view of an ear cup assembly with an earcup cushion housing compression sensor triggers mounted to an ear cup plate according to an embodiment of the present disclosure.

FIG. 4 is a graphical diagram illustrating a cross-sectional perspective view of an ear cup cushion housing front and rear compression sensor triggers of an ear cup assembly for an audio headset according to an embodiment of the present disclosure. An ear cup cushion 431 in an embodiment may house first and second, front and rear compression sensor triggers 460 and 440, respectively, which may be mounted to an ear cup plate 452 housed within an ear cup cover 421. A first front electrical contact plate 473 in an embodiment may be operatively coupled to a first front electrically conductive connector 475 and a second electrical contact plate (e.g., 372 of FIG. 3) may be operatively coupled to a second electrically conductive connector (e.g., 374 of FIG. 3) to form a front compression triggered electrical connection to the PCB 432. A first rear electrical contact plate 495 in an embodiment may be operatively coupled to a first rear electrically conductive connector 454 and a second electrical contact plate (e.g., 353 of FIG. 3) may be operatively coupled to a second electrically conductive connector (e.g., 355 of FIG. 3) to form a front compression triggered electrical connection to the PCB 432.

A rear compression triggered electrical connection of a second compression sensor trigger 440 comprising the first and second rear electrical contact plates 495 (and 353 of FIG. 3) and the first and second rear electrically conductive connectors 454 (and 355 of FIG. 3) may operatively couple to the PCB 432. A front compression triggered electrical connection of a first compression sensor trigger 460 comprising the first and second front electrical contact plate 473 (and 372 of FIG. 3), and the first and second front electrically conductive connector 475 (and 374 of FIG. 3) in an embodiment may be operatively coupled to the PCB 432. For example, the first and second rear electrically conductive connectors 454 (and 354 and 355 of FIG. 3), and the first and second front electrically conductive connector 475 (and 374 and 375 of FIG. 3) may be operatively coupled to the PCB 432 such that an electrical circuit is closed and power is supplied to the speaker 426, microphone, or other headset components only when electrical current flows at the PCB 432 due to a closed circuit of both sides the rear compression sensor trigger 440 or at both sides of the front compression sensor trigger 460. A closed circuit at both sides of the first compression sensor trigger 460, a closed circuit at both sides of the second compression sensor trigger 440, or two closed circuits at both sides of each of the first and second compression sensor triggers 440 and 460 may be required in order to trigger power delivery to the PCB 432 in various embodiments herein.

A rear surface of an ear cup plate 452 may be operatively coupled in an embodiment to an ear cup sound chamber 494 housing the speaker 426 that is also operatively coupled to the PCB 432. A front surface of the ear cup plate 452 in an embodiment may be operatively coupled to the front and rear compression sensor triggers 460 and 440, respectively. The front and rear compression sensor triggers 460 and 440, respectively, in an embodiment, may be disposed within an ear cup cushion 431 fixed to the ear cup plate 432 such that compression of the cushion 431 when worn by a user causes compression of either or both the front and rear compression sensor triggers 460 and 440, respectively.

Figure 5:
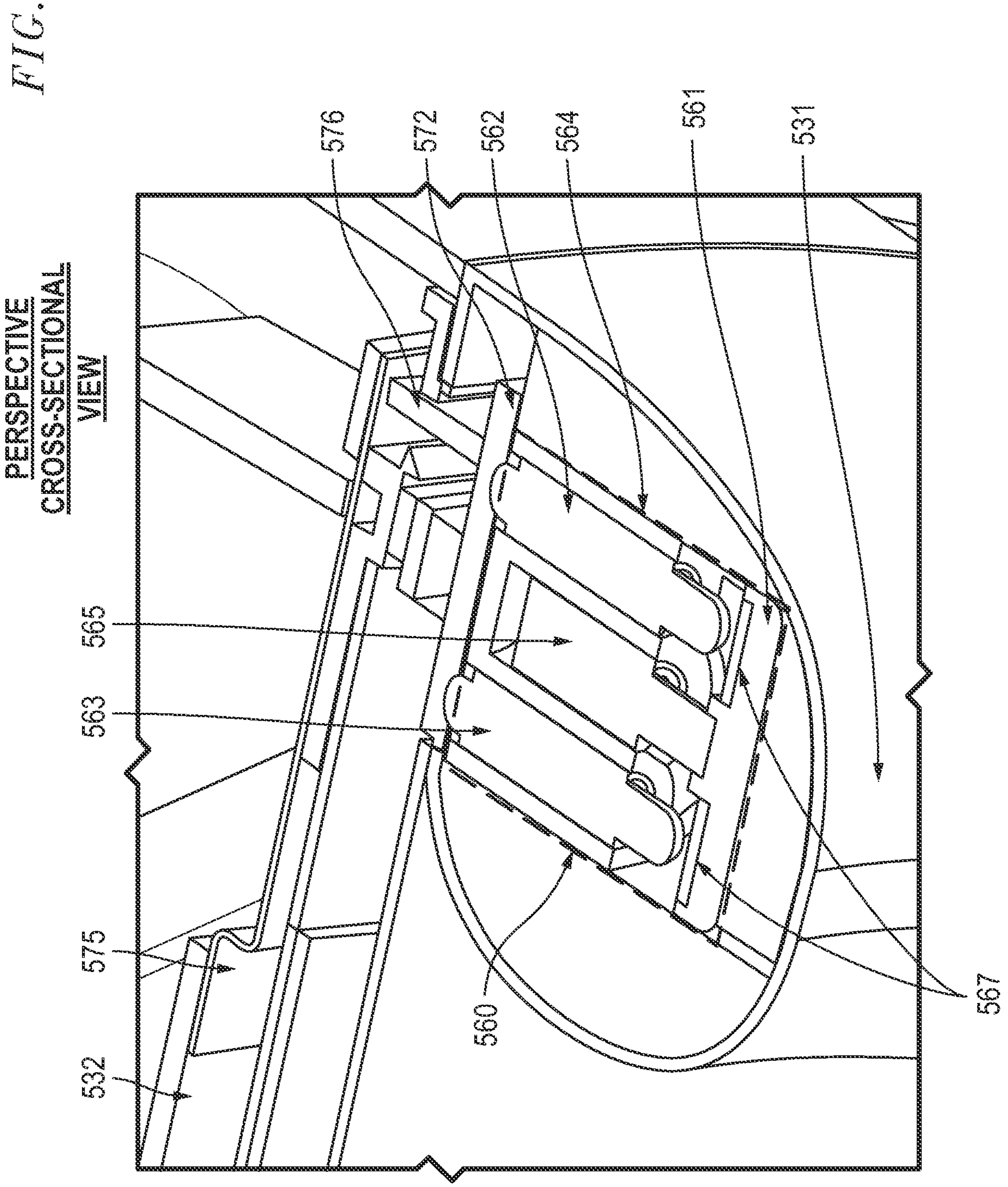
FIG. 5 is a graphical diagram illustrating a perspective cross-sectional close up view of a front compression sensor trigger housed within an earcup cover in electrically conductive contact with a PCB within an ear cup assembly according to an embodiment of the present disclosure.

FIG. 5 is a graphical diagram illustrating a perspective cross-sectional, close-up view of an ear cup cushion housing a front compression sensor trigger operatively coupled with a printed circuit board (PCB) within an ear cup assembly of an audio headset according to an embodiment of the present disclosure. A first compression sensor trigger 560 may be formed in an embodiment by disposing two pogo contacts

562 and 563, respectively, and a spring switch 565 within a compression sensor sleeve 564 and operatively coupling a compression sensor cap 561 to the spring switch 565. The compression sensor cap 561 in an embodiment may move in and out under compression or decompression of the spring switch 565, or pogo contacts 562 and 563 which may be spring biased, within a cavity in compression sensor sleeve 564, such that movement of the compression sensor cap 561 toward the compression sensor sleeve 564 causes both pogo contacts 562 and 563 to extend beyond the back edge of the compression sensor sleeve 564, coming into electrically conductive contact with a first front electrically conductive contact plate (e.g., 372 of FIG. 3) and a second electrically conductive contact plate 572 (e.g., 373 of FIG. 3), that are electrically isolated from another. The inner surfaces 567 of the compression sensor cap 561 may be electrically conductive to bridge the electrical current between the pogo contacts 562 and 563.

A first front electrical contact plate 572 in an embodiment may be operatively coupled to a first front electrically conductive connector 575 via an electrically conductive pin 576. A second electrical contact plate (e.g., 372 of FIG. 3) may be operatively coupled to a second electrically conductive connector (e.g., 374 of FIG. 3) or another pin. The first and second front electrically conductive connectors 575 (and 374 of FIG. 3) in an embodiment may be operatively coupled to PCB 532 such that a circuit between the PCB 532 and both of the pogo contacts 562 and 563 is closed when the first compression sensor trigger 560 is compressed to supply or trigger the supply of power to the speaker, microphone, or other headset components only when the cushion 531 is compressed. Compression of the compression sensor cap 561 toward the compression sensor sleeve 564 closes the circuit via the inner surfaces 567 of the compression sensor cap 561 across the pogo contacts 562 and 563 with the PCB 532. The first compression sensor trigger 560 includes compression sensor cap 561 with inner electrically conductive surface 567 (shown with connection point to spring switch 565 in the middle but having electrical coupling around both sides), sleeve 564, spring switch 565, and pogo contacts 562 and 563 in an embodiment and is disposed within the ear cup cushion 531 such that compression of the cushion 531 when worn by a user causes compression of the front compression sensor trigger 560 and electrically conductive contact between the front compression sensor pogo contacts 562 and 563, the electrical contact plates 572 (and 372 of FIG. 3) and across the inner electrically conductive surface 567 of the compression sensor cap 561.

Figure 6A:
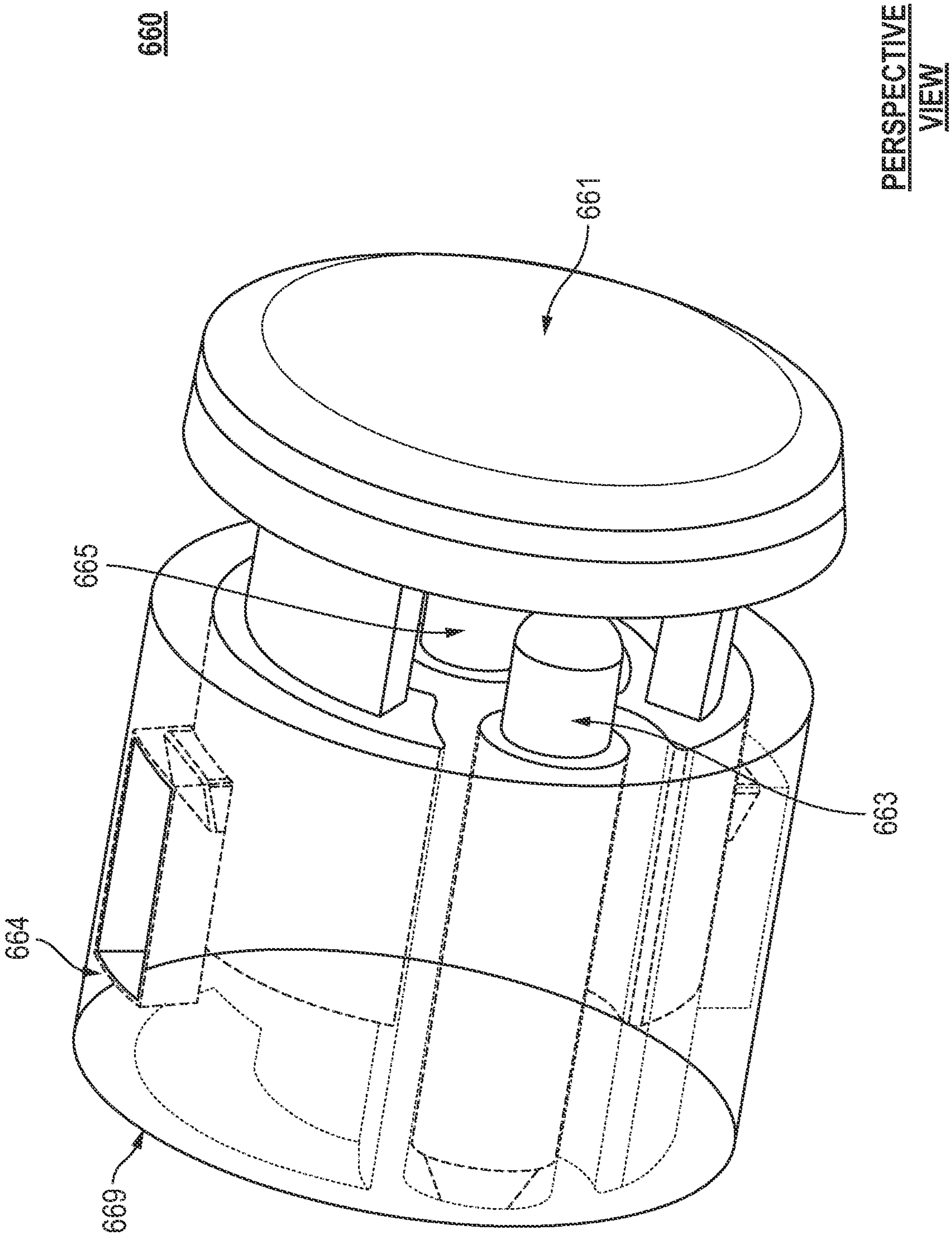
FIG. 6A is a graphical diagram illustrating a front perspective view of a compression sensor trigger for sensing when an audio headset is worn by a user according to an embodiment of the present disclosure.

FIG. 6A is a graphical diagram illustrating a front perspective view of a compression sensor trigger for sensing compression of an ear cup cushion housing the compression sensor trigger when an audio headset is worn by a user according to an embodiment of the present disclosure. A compression sensor trigger 660 may be formed in an embodiment by disposing two pogo contacts, including shown pogo contact 663 and a spring switch 665 within a compression sensor sleeve 664 and operatively coupling the compression sensor cap 661 to the spring switch 665. The compression sensor cap 661 in an embodiment may move under compression or decompression of the spring switch 665, causing a portion of spring switch 665 to retract into or extend from a cavity receiver having a spring inside the compression sensor sleeve 664. Movement of the compression sensor cap 661 toward the compression sensor sleeve 664 causes both pogo contacts, including 663 to extend beyond the edge 669 of the compression sensor sleeve 664 and contact a conductive plate on the inside of the compression sensor cap 661.

The pogo contacts, including shown pogo contact 663 in an embodiment may be comprised of an electrically conductive material, such as copper, and they may also be spring-biased in embodiments herein. The pogo contacts such as 663 are formed to remain within a pogo contact receiving cavity in the compression sensor sleeve 664 and out of electrically conductive contact with electrically conductive contact plates or the electrically conductive inside surface of the compression sensor cap 661 unless compressed with motion of the compression sensor cap 661 toward the compression sensor sleeve 664 to engage a conductive surface under the compression sensor cap 661. The spring switch 665 may be biased by a spring to push the compression sensor cap 661 away from the pogo contacts, including 663, such that the compression sensor cap 661 only comes into contact with the pogo contacts, including 663 and moves those pogo contacts with respect to the compression sensor sleeve 664 under compression of the sensor cap 661. Such a compression force may be caused by the user wearing an audio headset with an ear cup cushion housing the compression sensor trigger 660, and may be sufficient to overcome the spring-loaded force of the spring switch 665, while the user's head compresses the ear cup cushion.

Figure 6B:
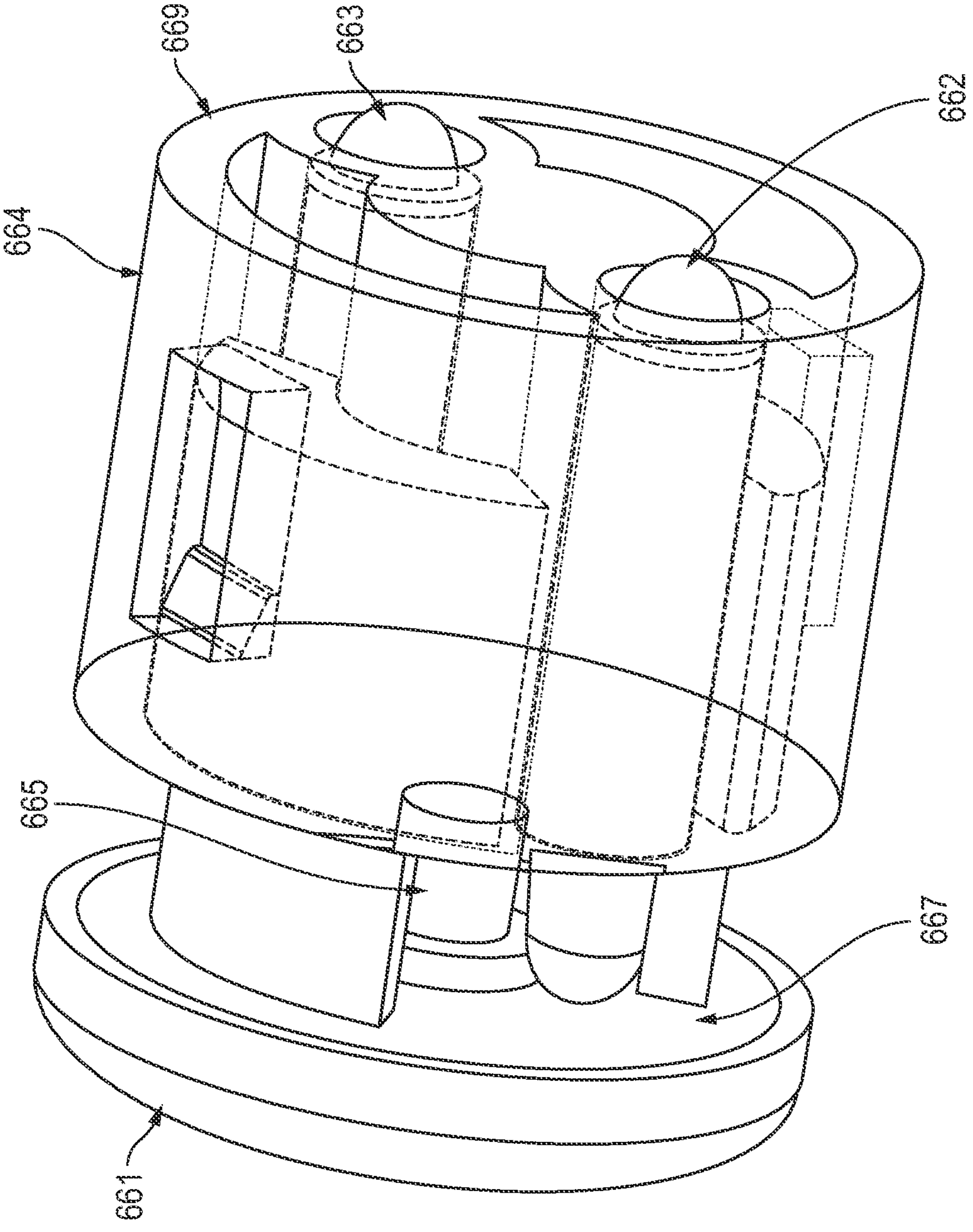
FIG. 6B is a graphical diagram illustrating a rear perspective view of a compression sensor trigger for sensing when an audio headset is worn by a user according to an embodiment of the present disclosure.

FIG. 6B is a graphical diagram illustrating a rear perspective view of a compression sensor trigger for sensing compression of an ear cup cushion housing the compression sensor trigger when an audio headset is worn by a user according to an embodiment of the present disclosure. A compression sensor trigger 660 may be formed in an embodiment by disposing two pogo contacts 662 and 663 and a spring switch 665 within receiver cavities in a compression sensor sleeve 664 and operatively coupling the compression sensor cap 661 to the spring switch 665. The compression sensor cap 661 in an embodiment may move under compression or decompression of the spring switch 665 from compression of an ear cup cushion. Movement of the compression sensor cap 661 toward the compression sensor sleeve 664 causes both pogo contacts 662 and 663 to extend beyond the back edge 669 of the compression sensor sleeve 664. This movement of the compression sensor cap 661 toward the compression sensor sleeve 664 in an embodiment may also cause an electrically conductive inner surface 667, such as copper, of the compression sensor cap 661 to come into electrically conductive contact with both pogo contacts 662 and 663, and both pogo contacts 662 and 663 to come into electrically conductive contact with a first front electrically conductive contact plate (e.g., 372 of FIG., 3) and a second front electrically conductive contact plate (e.g., 373 of FIG. 3), respectively.

The pogo contacts 662 and 663 in an embodiment may be comprised of an electrically conductive material, such as copper, and they may be spring-biased to remain within their respective cavities of the compression sensor sleeve 664 and out of electrically conductive contact with electrically conductive contact plates (e.g., 372 and 373 of FIG. 3) unless compressed with motion of the compression sensor cap 661 toward the compression sensor sleeve 664. In such an example embodiment, compression sensor cap 661 may only move those pogo contacts 662 and 663 with respect to the compression sensor sleeve 664 under compression of the sensor cap 661 and the pogo contacts 662 and 663. In another example embodiment, the spring switch 665 may be biased with a spring to push the compression sensor cap 661 away from the pogo contacts 662 and 663 and the compression sensor sleeve 664 and extend the spring switch 665 from the compression sensor sleeve 664 toward the compression sensor cap 661. In such an example embodiment, compression sensor cap 661 may only come into contact with the pogo contacts 662 and 663 and moves those pogo contacts 662 and 663 with respect to the compression sensor sleeve 664 under compression of the sensor cap 661 and the spring switch 665 when a portion of spring switch 665 is pushed into the compression sensor sleeve 664. Such a compression force may be caused by the user wearing an audio headset with an car cup cushion housing the compression sensor trigger 660, and may be sufficient to overcome the spring-loaded force of the spring switch 665.

Figure 7:
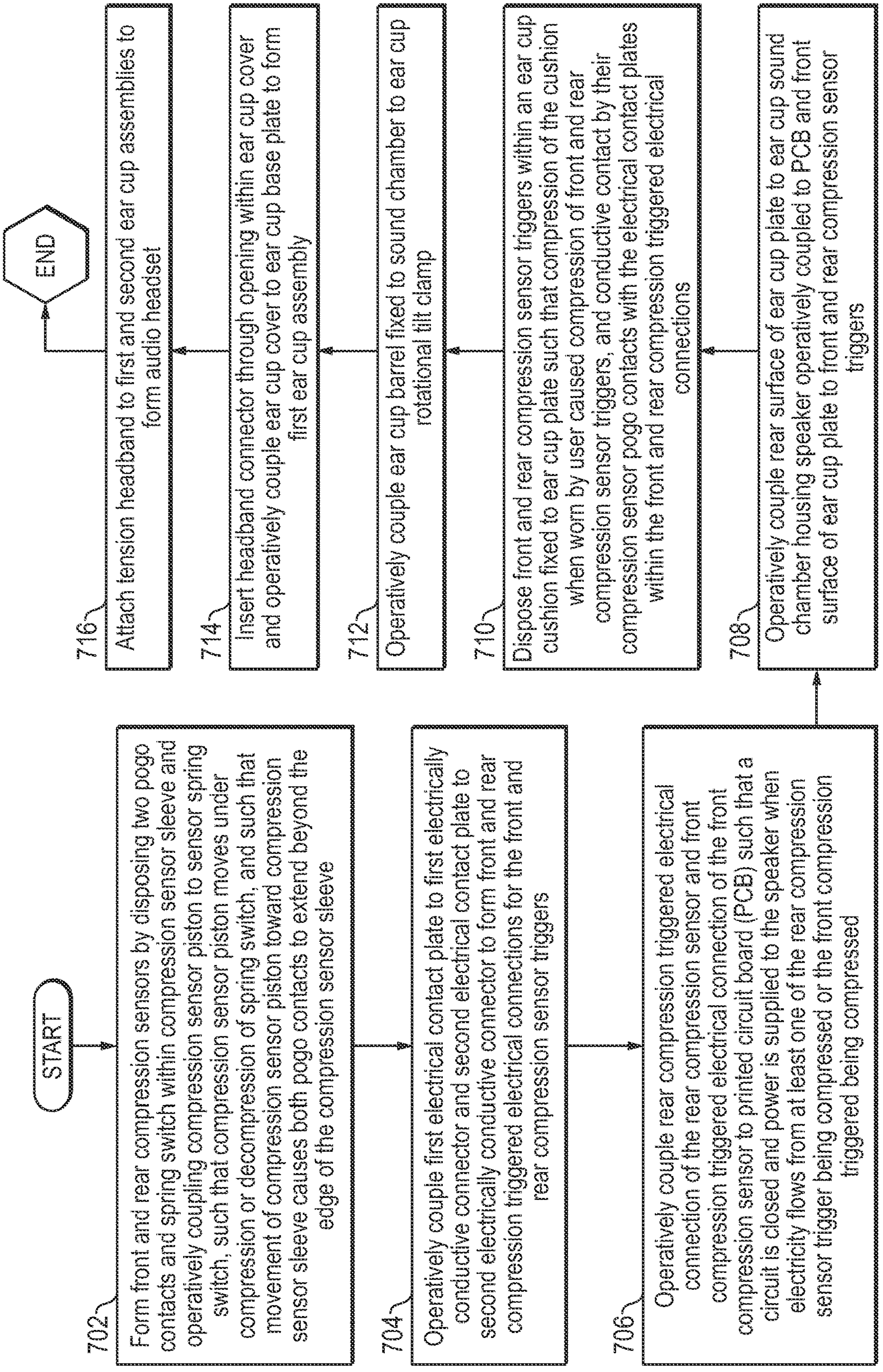
FIG. 7 is a flow diagram illustrating a method of manufacturing an audio headset incorporating a front compression sensor trigger or a rear compression sensor trigger of a compression triggered headset power saving system according to an embodiment of the present disclosure.

FIG. 7 is a flow diagram illustrating a method of manufacturing an audio headset incorporating a front compression sensor trigger or a rear compression sensor trigger of a compression triggered headset power saving system to conserve power supplied to a speaker, microphone, or other headset components of the headset when not in use by a wearer according to an embodiment of the present disclosure. As described herein, the compression triggered headset power saving system incorporating one or more compression sensor triggers into the earcup cushions of each earcup in an audio headset may detect when the headset is being worn by a user to turn off power while not being worn while also consuming less power than use of a proximity sensor.

At block 702, front and rear compression sensor triggers may be formed in an embodiment by disposing two pogo contacts and a spring switch within a compression sensor sleeve and operatively coupling the compression sensor cap to the sensor spring switch. The compression sensor cap has an electrically conductive inner surface in an embodiment and may move under compression or decompression of the spring switch or pogo contacts, and such that movement of the compression sensor cap toward the compression sensor sleeve contacts and causes both pogo contacts to extend beyond a back edge of the compression sensor sleeve to electrically engage contact plates formed at the back edge of the compression sensor triggers.

For example, in an embodiment described with reference to FIG. 3, a front compression sensor trigger 360 may include two pogo contacts 362 and 363 and a compression sensor cap 361. The compression sensor cap 361 in an embodiment may move under compression or decompression of a spring switch or pogo contacts situated between the pogo contacts 362 and 363, such that movement of the compression sensor cap 361 toward a compression sensor sleeve housing the pogo contacts 362 and 363 causes an electrically conductive inner surface of the compression sensor cap 361 to come into electrically conductive contact with both pogo contacts 362 and 363, and both pogo contacts 362 and 363 to come into electrically conductive contact with a first front electrically conductive contact plate 372 and a second front electrically conductive contact plate 373, respectively. A rear compression sensor trigger 360 in an embodiment may include two pogo contacts 342 and 343 and a compression sensor cap 341. The compression sensor cap 341 in an embodiment may move under compression or decompression of a spring switch or pogo contacts situated between the pogo contacts 342 and 343, such that movement of the compression sensor cap 341 toward a compression sensor sleeve housing the pogo contacts 342 and 343 causes an electrically conductive inner surface of the compression sensor cap 341 to come into electrically conductive contact with both pogo contacts 342 and 343, and both pogo contacts 342 and 343 to come into electrically conductive contact with a first rear electrically conductive contact plate 352 and a second rear electrically conductive contact plate 353, respectively.

The electrically conductive contact plates 352, 353, 372, and 373 in various embodiments may comprise any type of electrically conductive material such as copper, for example. The electrically conductive contact plates 352 and 353 may be electrically insulated from one another, and the electrically conductive contact plates 372 and 373 may be electrically insulated from one another.

In another example embodiment described with respect to FIG. 5, a front compression sensor trigger 560 may be formed by disposing two pogo contacts 562 and 563, respectively, and a spring switch 565 within a compression sensor sleeve 564 and operatively coupling the compression sensor cap 561 to the sensor spring switch 565. The compression sensor cap 561 in an embodiment may move under compression or decompression of the spring switch 565 or pogo contacts 562 and 563, such that movement of the compression sensor cap 561 toward the compression sensor sleeve 564 causes electrical contact across both pogo contacts 562 and 563 and pushes them to extend beyond the back edge of the compression sensor sleeve 564, coming into electrically conductive contact with a first front electrically conductive contact plate 572 and a second electrically conductive contact plate (e.g., 372 of FIG. 3).

In yet another example embodiments described with respect to FIGS. 6A and 6B, a compression sensor trigger 660 may be formed by disposing two pogo contacts 662 and 663 and a spring switch 665 within a compression sensor sleeve 664 and operatively coupling the compression sensor cap 661 to the spring switch 665. The pogo contacts 662 and 663 in an embodiment may be comprised of an electrically conductive material, such as copper, and may move toward the compression sensor sleeve 664 under compression of the compression sensor cap 661. In such an example embodiment, compression sensor cap 661 may only move those pogo contacts 662 and 663 with respect to the compression sensor sleeve 664 under compression of the sensor cap 661 toward the pogo contacts 662 and 663 and spring switch 665. Such a compression force may be caused by the user wearing an audio headset with an ear cup cushion housing the compression sensor trigger 660, and may be sufficient to overcome the spring-loaded force of the spring switch 665.

This movement of the compression sensor cap 661 with an electrically conductive inner surface 667 toward the compression sensor sleeve 664 in an embodiment causes an electrically conductive inner surface 667 of the compression sensor cap 661 to come into electrically conductive contact with both pogo contacts 662 and 663, and both pogo contacts 662 and 663 to come into electrically conductive contact with a first front electrically conductive contact plate (e.g., 372 of FIG., 3) and a second front electrically conductive contact plate (e.g., 373 of FIG. 3), respectively.

A first electrical contact plate in an embodiment at block 704 may be operatively coupled to a first electrically conductive connector and a second electrical contact plate may be operatively coupled to a second electrically conductive connector to form front and rear compression triggered electrical connections. For example, in an embodiment described with reference to FIG. 3, a first front electrical contact plate 372 may be operatively coupled to a first front electrically conductive connector 374 and a second front electrical contact plate 373 may be operatively coupled to a second front electrically conductive connector 375 to form a front compression triggered electrical connection. A first rear electrical contact plate 352 in an embodiment may be operatively coupled to a first rear electrically conductive connector 354 and a second rear electrical contact plate 353 may be operatively coupled to a second rear electrically conductive connector 355 to form a rear compression triggered electrical connection.

In another example embodiment described with respect to FIG. 4, a first front electrical contact plate 473 may be operatively coupled to a first front electrically conductive connector 475 and a second electrical contact plate (e.g., 372 of FIG. 3) may be operatively coupled to a second electrically conductive connector (e.g., 374 of FIG. 3) to form a front compression triggered electrical connection to the PCB 432. A first rear electrical contact plate 495 in an embodiment may be operatively coupled to a first rear electrically conductive connector 454 and a second electrical contact plate (e.g., 353 of FIG. 3) may be operatively coupled to a second electrically conductive connector (e.g., 355 of FIG. 3) to form a front compression triggered electrical connection to the PCB 432.

In yet another example embodiment described with respect to FIG. 5, a first front electrical contact plate 572 may be operatively coupled to a first front electrically conductive connector 575 via an electrically conductive pin or contact 576. A second electrical contact plate (e.g., 372 of FIG. 3) may be operatively coupled to a second electrically conductive connector (e.g., 374 of FIG. 3) via another electrically conductive pin or contact.

At block 706, a rear compression sensor trigger operates to provide a compression triggered electrical connection and a front compression sensor trigger operates to provide a compression triggered electrical connection in an embodiment that may be operatively coupled to a printed circuit board (PCB) such that a circuit is closed and power is supplied to the speaker, microphone, or other headset components only when electricity flows from closing a circuit for at least one of the rear compression triggered electrical connection and the front compression triggered electrical connection to the PCB in an embodiment. In other embodiments, such electricity may only flow when both circuits from both the rear and front compression sensor triggers are closed. As described in an embodiment with respect to FIG. 1, a printed circuit board (PCB) 132 may operate to receive power supplied by the power management unit (PMU) 104 or internal batteries 127, and to supply power to the speaker 126, microphone 124, or other headset components. The compression triggered headset power saving system 190 may ensure that such power is supplied to the speaker 126, microphone 124, or other headset components via the PCB 132 only when a front compression sensor trigger 160 or a rear compression sensor trigger 140, or both are placed into electrically conductive contact with the PCB 132 to supply or trigger supply of power to audio headset 120 and its components. This may occur in an embodiment, when an earcup cushion for the audio headset 120 is compressed against the head of car of a wearer, indicating that the audio headset 120 is in use by the wearer, and the front compression sensor trigger 160 or rear compression sensor trigger 140, or both, as situated within the ear cup cushion, are also compressed.

In another example embodiment described with respect to FIG. 3, a rear compression sensor trigger 340 for a compression triggered electrical connection and a front compression sensor trigger 360 for a second compression triggered electrical connection may be operatively coupled to a PCB 332. For example, the first rear electrically conductive connector 354 and the second rear electrically conductive connector 355 of the rear compression triggered electrical connection from a rear compression sensor trigger 340 in an embodiment may be operatively coupled to the PCB 332. In an embodiment, the PCB 332 may supply an electrical current to the first rear electrically conductive connector 354, which may deliver electrical current to the first rear electrically conductive contact plate 352. When the rear compression sensor trigger 340 and its compression sensor cap 341 is compressed and placed in electrically conductive contact with the second rear electrically conductive contact plate 353 via pogo pin 343, this electrical current may be further delivered to the second rear electrically conductive connector 355, and back to the PCB 332. This closes an electrical circuit of the compressed rear compression sensor trigger 340. The PCB 332 in an embodiment may then deliver power or be triggered to deliver power to a speaker, microphone, or other headset components housed within the ear cup housing the car cup cushion 331. When the rear compression sensor trigger 340 containing the compression sensor cap 341 is not compressed, this electrical circuit may remain open.

A front compression sensor trigger 360 may also provide for a front compression triggered electrical connection in an embodiment and may be operatively coupled to the PCB 332. For example, the first front electrically conductive connector 374 and the second front electrically conductive connector 375 of the front compression triggered electrical connection in an embodiment may be operatively coupled to the PCB 332. In an embodiment, the PCB 332 may supply an electrical current to the first front electrically conductive connector 374, which may deliver electrical current to the first front electrically conductive contact plate 372. When the front compression sensor trigger 360 having the compression sensor cap 361 is compressed and placed in electrically conductive contact with the second front electrically conductive contact plate 373 via pogo pin 363, this electrical current may be further delivered to the second front electrically conductive connector 375, and back to the PCB 332. This closes an electrical circuit of the front compression sensor trigger 360. The PCB 332 in an embodiment may then deliver or be triggered to deliver power to a speaker, microphone, or other headset components housed within the ear cup housing the ear cup cushion 331. In other embodiments, the PCB 332 may only deliver power to the speaker, microphone, or other headset components when both of the compression sensor triggers are compressed, to close both circuits of the front compression sensor trigger 360 and the rear compression sensor trigger 340. When the front compression sensor trigger 360 having the compression sensor cap 361 is not compressed, this electrical circuit may remain open.

In yet another example embodiment described with respect to FIG. 4, a rear compression triggered electrical connection for a compressed rear compression sensor trigger 440 comprising the first and second rear electrical contact plates 495 and 353 of FIG. 3 and the first and second rear electrically conductive connectors 454 and 355 of FIG. 3, and a front compression triggered electrical connection for a compressed front compression sensor trigger 460 comprising the first and second front electrical contact plates 473 and 372 of FIG. 3, and the first and second front electrically conductive connector 475 and 374 of FIG. 3 may be operatively coupled to the PCB 432. For example, the first and second rear electrically conductive connectors 454 and 355 of FIG. 3, and the first and second front electrically conductive connector 475 and 374 of FIG. 3 may be operatively coupled to the PCB 432 such that an electrical circuit is closed and power is supplied to the speaker 426, microphone, or other headset components only when electrical current flows between the PCB 432 to both the rear compression sensor trigger 440 and the front compression sensor trigger 460, and back to the PCB 432.

In still another example embodiment described with respect to FIG. 5, the first and second front electrically conductive connectors 575 and 374 of FIG. 3 may be operatively coupled to PCB 532 such that a circuit between the PCB 532 and both of the pogo contacts 562 and 563 is closed and power is supplied to the speaker, microphone, or other headset components only when the cushion 531 is compressed, causing compression of the compression sensor cap 561 toward the compression sensor sleeve 564.

A rear surface of an ear cup plate may be operatively coupled in an embodiment at block 708 to an ear cup sound chamber housing a speaker that is also operatively coupled to the PCB and a front surface of the ear cup plate may be operatively coupled to the front and rear compression sensor triggers. For example, in an embodiment described with reference to FIG. 2B, a rear surface of an ear cup plate 295 may be operatively coupled to an ear cup sound chamber 294 and a front surface of the ear cup plate 295 may be operatively coupled to the front and rear compression sensor triggers 260 and 240, respectively, that are housed in an ear cup cushion 231. The front and rear compression sensor triggers 260 and 240 are operatively coupled to a PCB via an electrical connection.

In another example embodiment described with respect to FIG. 4, a rear surface of an ear cup plate 452 may be operatively coupled in an embodiment to an ear cup sound chamber 494 housing the speaker 426 that is also operatively coupled to the PCB 432. A front surface of the ear cup plate 452 in an embodiment may be operatively coupled to the front and rear compression sensor triggers 460 and 440, respectively which are operatively coupled to PCB 432 via a first rear electrically conductive contact plate 495 and a first front electrically conductive contact plate 473 as well as a first front electrically conductive connector 454 and a first rear electrically conductive connector 475. As described in an embodiment with respect to FIG. 1, a compression triggered headset power saving system 190 may ensure that power is supplied to the speaker 126, microphone 124, or other headset components via the PCB 132 only when a front compression sensor trigger 160 or a rear compression sensor trigger 140, or both are placed into electrically conductive contact with the PCB 132. This may occur in an embodiment, when an earcup cushion for the headset 120 is compressed against the head of car of a wearer, indicating that the headset 120 is in use by the wearer, and the front compression sensor trigger 160 or rear compression sensor trigger 140, or both, as situated within the ear cup cushion, are also compressed, as described in embodiments herein.

At block 710, front and rear compression sensor triggers in an embodiment may be disposed within an ear cup cushion fixed to the ear cup plate such that compression of the cushion when worn by a user causes compression of the front and rear compression sensor triggers to cause an electrically conductive contact between the compression sensor pogo contacts of at least one or both of the front or other compression sensor triggers in an embodiments. The conductive inner surface of the compression sensor cap urges the compression sensor pogo contacts to engage the electrical contact plates within the front and rear compression triggered electrical connections for each of the front and rear compression sensor triggers. For example, in an embodiment described with respect to FIG. 2A, front and rear compression sensor triggers 260 and 240, respectively, may be disposed within an ear cup cushion 231 fixed to an ear cup plate such that compression of the cushion 231 when worn by a user causes compression of the front and rear compression sensor triggers 260 and 240, respectively. In another example embodiment described with respect to FIG. 4, the front and rear compression sensor triggers 460 and 440, respectively, may be disposed within an ear cup cushion 431 fixed to the ear cup plate 432 such that compression of the cushion 431 when worn by a user causes compression of the front and rear compression sensor triggers 460 and 440, respectively. As described in an embodiment with respect to FIG. 1, a compression triggered headset power saving system 190 may ensure that power is supplied to the speaker 126 via the PCB 132 only when an earcup cushion for the audio headset 120 is compressed against the head of car of a wearer, indicating that the audio headset 120 is in use by the wearer, and the front compression sensor trigger 160 or rear compression sensor trigger 140, or both, as situated within the ear cup cushion, are also compressed, placing the compression sensor triggers 140 or 160, or both into electrically conductive contact with the PCB 132.

As another example, in an embodiment described with reference to FIG. 3, the front compression sensor trigger 360 including compression sensor trigger cap 361 and pogo contacts 362 and 363 may be disposed within the ear cup cushion 331 such that compression of the cushion 331 when worn by a user causes compression of the front compression sensor cap 361 and pogo contacts 362 and 363 toward the first and second front electrically conductive plates 372 and 373, and electrically conductive contact between the pogo contacts 362 and 363 and the electrical contact plates 372 and 373, respectively. In an embodiment, the PCB 332 may supply electrical current to the first front electrically conductive connector 374, which may deliver electrical current to the first front electrically conductive contact plate 372. When the first front pogo contact 362 is in electrically conductive contact with the first front electrically conductive contact plate 372 and the electrically conductive inner surface of the compression sensor cap 361, this electrical current may be further delivered to the pogo contact 363 via the electrically conductive inner surface of the compression sensor cap 361. The second front electrically conductive contact plate 373 may be in electrically conductive contact with the pogo contact 363, to receive this power and deliver it to the PCB 332 via the second front electrically conductive connector 375. Thus, compression of the compression sensor cap 361, placing the electrically conductive inner surface of the compression sensor cap 361 into contact with the pogo contacts 362 and 363, and placing the pogo contacts 362 and 363 into electrically conductive contacts with the first and second front electrically conductive contact plates 372 and 373, respectively, may close a circuit between the front compression sensor trigger 360 and the PCB 332.

The rear compression sensor trigger 340 including compression sensor trigger cap 341 and pogo contacts 342 and 343 in an embodiment may be disposed within the ear cup cushion 331 such that compression of the cushion 331 when worn by a user causes compression of the rear compression sensor cap 341 and pogo contacts 342 and 343 toward the first and second rear electrically conductive plates 352 and 353, and electrically conductive contact between the pogo contacts 342 and 343 and the electrical contact plates 352 and 353, respectively. In an embodiment, the PCB 332 may supply an electrical current to the first rear electrically conductive connector 354, which may deliver electrical current to the first rear electrically conductive contact plate 352. When the first rear pogo contact 342 is in electrically conductive contact with the first rear electrically conductive contact plate 352 and the electrically conductive rear surface of the compression sensor cap 341, this electrical current may be further delivered to the pogo contact 343 via the electrically conductive rear surface of the compression sensor cap 341. The second rear electrically conductive contact plate 353 may be in electrically conductive contact with the pogo contact 343, to receive this electrical current and deliver it to the PCB 332 via the second rear electrically conductive connector 355. Thus, compression of the compression sensor cap 341, placing the electrically conductive inner surface of the compression sensor cap 341 into contact with the pogo contacts 342 and 343, and placing the pogo contacts 342 and 343 into electrically conductive contacts with the first and second rear electrically conductive contact plates 352 and 353, respectively, may close a circuit between the rear compression sensor trigger 340 and the PCB 332.

In yet another example embodiment described with respect to FIG. 5, the front compression sensor trigger including compression sensor cap 561, sleeve 564, spring switch 565, and pogo contacts 562 and 563 may be disposed within the ear cup cushion 531 such that compression of the cushion 531 when worn by a user causes compression of the front compression sensor trigger and electrically conductive contact between the front compression sensor pogo contacts 562 and 563 and the electrical contact plates 572 (as well as 374 shown in FIG. 3), respectively.

In still other example embodiments described with respect to FIGS. 6A and 6B, the pogo contacts 662 and 663 in an embodiment may be comprised of an electrically conductive material, such as copper, and they may be spring-biased to remain within their respective cavities of the compression sensor sleeve 664 and out of electrically conductive contact with electrically conductive contact plates (e.g., 372 and 373 of FIG. 3) and compression sensor cap 661 unless compressed with motion of the compression sensor cap 661 toward the compression sensor sleeve 664. In such an example embodiment, compression sensor cap 661 may only move those pogo contacts 662 and 663 with respect to the compression sensor sleeve 664 under compression of the sensor cap 661 and the pogo contacts 662 and 663. In an example embodiment, the spring switch 665 may be biased with a spring to push the compression sensor cap 661 away from the pogo contacts 662 and 663 and the compression sensor sleeve 664 and extend the spring switch 665 from the compression sensor sleeve 664 toward the compression sensor cap 661. In such an example embodiment, compression sensor cap 661 may only come into contact with the pogo contacts 662 and 663 and moves those pogo contacts 662 and 663 with respect to the compression sensor sleeve 664 under compression of the sensor cap 661 and the spring switch 665 by compression of the earcup cushion when the spring switch 665 is pushed into the compression sensor sleeve 664. Such a compression force may be caused by the user wearing an audio headset with an ear cup cushion housing the compression sensor trigger 660, and may be sufficient to overcome the spring-loaded force of the spring switch 665.

An ear cup barrel in an embodiment at block 712 fixed to the sound chamber may be operatively coupled to an ear cup rotational tilt clamp. For example, in an embodiment described with respect to FIG. 2B, an ear cup barrel 292 fixed to the sound chamber 294 via a rod 293 may be operatively coupled to an ear cup rotational tilt clamp 291.

At block 714 in an embodiment, a headband connector of a clamping headband may be inserted through an opening within the ear cup cover and the ear cup cover may be operatively coupled to the ear cup base plate to form a first ear cup assembly. For example, in embodiments described with respect to FIGS. 2A and 2B, a headband connector 222 may be inserted through an opening 223 within an ear cup cover 221 and the ear cup cover 221 may be operatively coupled to an ear cup base plate on the rear surface of the ear cup cushion 231 to form a first ear cup assembly 224. A second ear cup assembly 226 may also be formed in a similar manner. A headband connector may be inserted through a second opening within a second ear cup cover and the ear cup cover may be operatively coupled to the ear cup base plate to form a second ear cup assembly 226, as shown in FIG. 2A.

A clamping headband may be attached in an embodiment at block 716 to the first and second ear cup assemblies to form a headset. For example, in an embodiment described with reference to FIG. 2A, a clamping headband 225 may be attached to the first and second ear cup assemblies 224 and 226, respectively to form an audio headset 220. In such a way, an audio headset may be manufactured to incorporate a compression triggered headset power saving system to conserve power supplied to a speaker, microphone, or other headset components of the headset when compression sensor triggers housed within an earcup cushion indicate that the headset is not in use. The method for manufacturing an audio headset incorporating a front compression sensor trigger or a rear compression sensor trigger of a compression triggered headset power saving system to conserve power supplied to a speaker, microphone, or other headset components of the headset when not in use by a wearer may then end.

Figure 8:
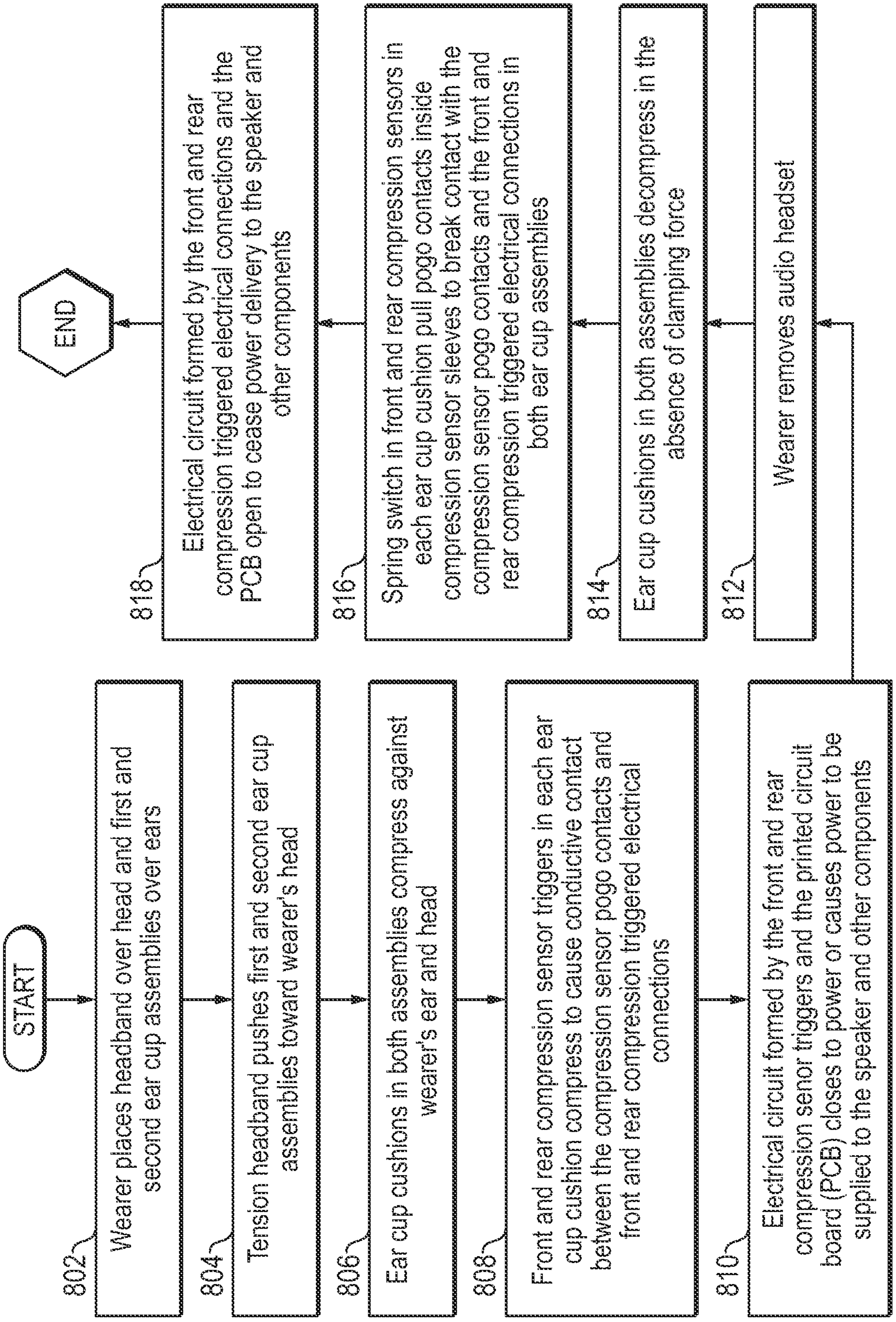
FIG. 8 is a flow diagram illustrating a method of conserving power supplied to the headset when compression sensor triggers of the headset indicate that the headset is not in use by a wearer according to an embodiment of the present disclosure.

FIG. 8 is a flow diagram illustrating a method of conserving power supplied to a speaker, microphone, or other headset components of an audio headset when one or more compression sensor triggers housed within earcup cushions of the headset indicate that the headset is not in use by a wearer according to an embodiment of the present disclosure. As described herein, when a user places the audio headset over their head and the ear cup assembly that includes the ear cup cushion over the user's ear, the ear cup cushion may compress and push the compression sensor trigger cap toward the sleeve of at least one of the compression sensor triggers to contact pogo contacts. This may cause the pogo contacts of the compression sensor trigger to extend away from the user, beyond the back edge of the compression sensor trigger sleeve, and to come into electrically conductive contact with the printed circuit board (PCB) of the headset via electrical contacts for such a compression sensor trigger. Such electrically conductive contact between the pogo contacts of the compression sensor trigger and the electrical contact plates and connectors housed within the ear cup assembly may effectively close an electrical circuit between the compression sensor trigger and the PCB. The compression triggered headset power saving system in embodiments may then trigger and allow power to be supplied to the speaker, microphone, or other headset components housed within the ear cup assembly. When this circuit is broken by removal of the audio headset from the user's head, however, the compression triggered headset power saving system may cease power delivery to the speaker, microphone, or other headset components. Such a compression sensor trigger to switch power in embodiments herein may consume less power than a conventional proximity sensor or other wear detection systems.

Upon removal of the headset from the user's head, the ear cup cushion may decompress. In such embodiments, the spring switch or the pogo contacts located within the compression sensor trigger may push the compression sensor cap away from the sleeve and decouple from the electrical contacts. This retraction may move the pogo contacts out of electrically conductive contact with the PCB, breaking the circuit required to deliver power to the speaker, microphone, or other headset components.

At block 802, a wearer in an embodiment may place a clamping headband over the wearer's head and first and second ear cup assemblies over the wearer's ears. For example, in an embodiment described with reference to FIG. 2A, a wearer of the headset 220 may place the headband 225 over the wearer's head and first and second ear cup assemblies 224 and 226, respectively over the wearer's ears.

The tension in the clamping headband in an embodiment at block 804 may push the first and second ear cup assemblies toward the wearer's head. For example, the clamping headband 225 may be formed to apply a clamping force to push the ear cup assemblies 224 and 226 toward one another. When the user wears the ear cup assemblies 224 and 226 on either side of the user's head, these ear cup assemblies 224 and 226 may push toward each other and toward the user's head under the influence of this clamping tension provided by the clamping headband 225.

At block 806, the ear cup cushions in both ear cup assemblies may compress against the wearer's ear and head in an embodiment. Under the clamping force provided by the clamping headband 225 pushing the ear cup assemblies 224 and 226 toward each other, an ear cup cushion, such as 231 located in each ear cup assembly 224 or 226 may compress against the user's head or ears.

In an embodiment at block 808, at least one of the front and rear, top and bottom, or other plurality of compression sensor triggers embedded in each ear cup cushion may compress to cause electrically conductive contact between the compression sensor pogo contacts and the front and rear compression triggered electrical connections of at least one compression sensor trigger. For example, in an embodiment of a compression sensor trigger 660 described with respect to FIGS. 6A and 6B, the pogo contacts 662 and 663 may be comprised of an electrically conductive material, such as copper, and they may be spring-biased to remain within their respective cavities of the compression sensor sleeve 664 and out of electrically conductive contact with electrically conductive contact plates (e.g., 372 and 373 of FIG. 3) unless compressed with motion of the compression sensor cap 661 toward the compression sensor sleeve 664. In an example embodiment, compression sensor cap 661 may only move those pogo contacts 662 and 663 with respect to the compression sensor sleeve 664 under compression of the sensor cap 661 and the pogo contacts 662 and 663. In another example embodiment, the spring switch 665 may be biased with a spring to push the compression sensor cap 661 away from the pogo contacts 662 and 663 and the compression sensor sleeve 664 and extend the spring switch 665 from the compression sensor sleeve 664 toward the compression sensor cap 661. In such an example embodiment, compression sensor cap 661 may only come into contact with the pogo contacts 662 and 663 and moves those pogo contacts 662 and 663 with respect to the compression sensor sleeve 664 under compression of the sensor cap 661 and the spring switch 665 when an earcup cushion is compressed and the spring switch 665 is pushed into the compression sensor sleeve 664. Such a compression force may be caused by the user wearing an audio headset with an ear cup cushion embedded with the compression sensor trigger 660, and the compression force is sufficient to overcome the spring-loaded force of the spring switch 665.

As described in an embodiment with respect to FIG. 1, a compression triggered headset power saving system 190 may ensure that such power is supplied or triggered to be supplied to the speaker 126, microphone 124, or other headset components, such as a digital signal processor 136 via the PCB 132 only when a front compression sensor trigger 160 or a rear compression sensor trigger 140, or both are placed into electrically conductive contact with the PCB 132. This may occur in an embodiment, when an earcup cushion for the audio headset 120 is compressed against the head of car of a wearer, indicating that the audio headset 120 is in use by the wearer, and the front compression sensor trigger 160 or rear compression sensor trigger 140, or both, as situated within the ear cup cushion, are also compressed. As another example described with respect to FIG. 2A, compression of a compression sensor trigger 240 or 260 may occur in an embodiment, when an earcup cushion 231 for the headset ear cup assembly 224 is compressed against the head of car of a wearer, indicating that the audio headset 220 is in use by the wearer, and the front compression sensor trigger 260 or rear compression sensor trigger 240, or both, situated within the ear cup cushion are also compressed.

At block 810, the electrical circuit formed by the front and rear compression triggered electrical connections and the front and rear compression sensor triggers and the printed circuit board (PCB) closes to power the PCB and thus, provide power or trigger power to be supplied to the speaker, microphone, or other headset components in an embodiment. For example, in embodiments described with respect to FIGS. 6A and 6B, movement of the compression sensor cap 661 toward the compression sensor sleeve 664 in an embodiment may cause an electrically conductive inner surface 667 of the compression sensor cap 661 to come into electrically conductive contact with both pogo contacts 662 and 663, and both pogo contacts 662 and 663 to come into electrically conductive contact with a first front electrically conductive contact plate (e.g., 372 of FIG., 3) and a second front electrically conductive contact plate (e.g., 373 of FIG. 3), respectively.

In another example embodiment described with respect to FIG. 5, the compression sensor cap 561 may move under compression or decompression of the spring switch 565 or pogo contacts 562 and 563, such that movement of the compression sensor cap 561 under compression toward the compression sensor sleeve 564 causes contact with both pogo contacts 562 and 563 and urges them to extend beyond the back edge of the compression sensor sleeve 564, coming into electrically conductive contact with a first front electrically conductive contact plate 572 and a second electrically conductive contact plate (e.g., 373 of FIG. 3).

A first front electrical contact plate 572 in an embodiment may be operatively coupled to a first front electrically conductive connector 575 via an electrically conductive pin or contact 576. A second electrical contact plate (e.g., 372 of FIG. 3) may be operatively coupled to a second electrically conductive connector (e.g., 374 of FIG. 3) via another electrically conductive pin or contact. The first and second front electrically conductive connectors 575 (and 372 of FIG. 3) in an embodiment may be operatively coupled to PCB 532 such that a circuit between the PCB 532 and both of the pogo contacts 562 and 563 is closed and power is supplied to the speaker, microphone, or other headset components only when the cushion 531 is compressed, and which causes compression of the compression sensor cap 561 toward the compression sensor sleeve 564. The front compression sensor trigger 560 including compression sensor cap 561, sleeve 564, spring switch 565, and pogo contacts 562 and 563 in an embodiment may be disposed within the ear cup cushion 531 such that compression of the cushion 531 when worn by a user causes compression of the front compression sensor trigger 560 and electrically conductive contact between the front compression sensor pogo contacts 562 and 563 and the electrical contact plates 572 (and 372 of FIG. 3), respectively.

In yet another example embodiment described with respect to FIG. 3, the PCB 332 may supply an electrical current to the first rear electrically conductive connector 354 of the rear compression sensor trigger 360, which may deliver electrical current to the first rear electrically conductive contact plate 352. When the first rear pogo contact 342 is in electrically conductive contact between the first rear electrically conductive contact plate 352 and the electrically conductive rear surface of the compression sensor cap 341, this electrical current may be further delivered to the second pogo contact 343 via the electrically conductive rear surface of the compression sensor cap 341. The second rear electrically conductive contact plate 353 may be in electrically conductive contact with the second pogo contact 343, to receive this power and deliver it to the PCB 332 via the second rear electrically conductive connector 355. Thus, compression of the compression sensor cap 341 of the compression sensor trigger 340, placing the electrically conductive inner surface of the compression sensor cap 341 into contact with the pogo contacts 342 and 343, and placing the pogo contacts 342 and 343 into electrically conductive contacts with the first and second rear electrically conductive contact plates 352 and 353, respectively, may close a circuit between the rear compression sensor trigger 340 and the PCB 332.

In an embodiment, the PCB 332 may supply power to the first front electrically conductive connector 374, which may deliver power to the first front electrically conductive contact plate 372 of the front compression sensor trigger 360. When the first front pogo contact 362 is in electrically conductive contact between the first front electrically conductive contact plate 372 and the electrically conductive inner surface of the compression sensor cap 361, this power may be further delivered to the second pogo contact 363 via the electrically conductive inner surface of the compression sensor cap 361. The second front electrically conductive contact plate 373 may be in electrically conductive contact with the second pogo contact 363, to receive this power and deliver it to the PCB 332 via the second front electrically conductive connector 375. Thus, compression of the compression sensor cap 361, placing the electrically conductive inner surface of the compression sensor cap 361 into contact with the pogo contacts 362 and 363, and placing the pogo contacts 362 and 363 into electrically conductive contacts with the first and second front electrically conductive contact plates 372 and 373, respectively, may close a circuit between the front compression sensor trigger 360 and the PCB 332. The PCB 332 in an embodiment may then deliver power to a speaker, microphone, or other headset components housed within the ear cup housing the ear cup cushion 331.

As also described in an embodiment with respect to FIG. 1, a PCB 132 in an embodiment may operate to receive power supplied by the PMU 104 or internal batteries 127, and to supply power to the speaker 126, microphone 124, or other headset components, such as a digital signal processor 131. As described herein, the compression triggered headset power saving system 190 may ensure that such power is supplied to the speaker 126, microphone 124, or other headset components, such as digital signal processor 131 via the PCB 132 only when a front compression sensor trigger 160 or a rear compression sensor trigger 140, or both are placed into electrically conductive contact with the PCB 132. This may occur in an embodiment, when an earcup cushion for the headset 120 is compressed against the head of car of a wearer, indicating that the headset 120 is in use by the wearer, and the front compression sensor trigger 160 or rear compression sensor trigger 140, or both, as situated within the ear cup cushion, are also compressed.

The wearer in an embodiment may remove the headset at block 812, which may cause the ear cup cushions in both ear cup assemblies to decompress in the absence of the clamping force on the wearer's ears or head at block 814. For example, in an embodiment described with reference to FIG. 2A, the wearer of the headset 220 may remove the headset 220, which may cause the ear cup cushions, such as 231 in both ear cup assemblies 224 and 226 to decompress in the absence of the clamping force supplied by the tension headband 225 on the wearer's ears or head.

In an embodiment at block 816, the spring switches in the front and rear compression sensor triggers in each ear cup cushion may push the compression sensor cap away from the pogo contacts inside the compression sensor sleeves and relax the engagement of the pogo contacts with the electrically conductive contact plates to break electrically conductive contact with the compression sensor pogo contacts and the front and rear compression triggered electrical connections with their electrical contacts in both the ear cup assemblies. For example, in embodiments described with reference to FIGS. 6A and 6B, the compression sensor cap 661 in an embodiment may move under compression or decompression of the spring switch 665. Movement of the compression sensor cap 661 away from the compression sensor sleeve 664 under released compression causes both pogo contacts, including 663 to retract within the back edge of the compression sensor sleeve 664. The pogo contacts 662 and 663 in an embodiment may be comprised of an electrically conductive material, such as copper, and they may be formed to remain within their respective cavities of the compression sensor sleeve 664 and out of electrically conductive contact with electrically conductive contact plates (e.g., 372 and 373 of FIG. 3) unless compressed with motion of the compression sensor cap 661 toward the compression sensor sleeve 664. The spring switch 665 may be biased with a spring to push the compression sensor cap 661 away from the pogo contacts 662 and 663 such that the compression sensor cap 661 breaks contact with the pogo contacts 662 and 663 and releases those pogo contacts from contact with electrical contact plates while they remain in the compression sensor sleeve 664.

At block 818, the electrical circuit formed by the front and rear compression triggered electrical connections and the PCB in an embodiment may open, causing power delivery to the speaker, microphone, or other headset components to cease. In example embodiments described with respect to FIGS. 6A and 6B, the pogo contacts 662 and 663 may be formed to remain within the compression sensor sleeve 664 but out of electrically conductive contact between electrically conductive contact plates (e.g., 372 and 373 of FIG. 3) and the compression sensor cap 661. In another example embodiment described with reference to FIG. 3, lack of a rear compression triggered electrical connection and lack of a front compression triggered electrical connection in an embodiment may electrically disconnect a printed circuit board (PCB) 332. For example, the first rear electrically conductive connector 354 and the second rear electrically conductive connector 355 of the rear compression triggered electrical connection in an embodiment may be operatively coupled to the PCB 332. In an embodiment, the PCB 332 may supply an electrical current to the first rear electrically conductive connector 354, which may deliver electrical current to the first rear electrically conductive contact plate 352. When the rear compression sensor trigger 340 containing the compression sensor cap 341 is not compressed, it is not in electrically conductive contact between the first rear electrically conductive contact plate 352 and the second rear electrically conductive contact plate 353 via pogo connectors 342 and 343. Electrical current is not further delivered to the second rear electrically conductive connector 355, and back to the PCB 332, thus the electrical circuit is open. The PCB 332 in an embodiment is not triggered to deliver power to a speaker, microphone, or other headset components housed within the ear cup housing the ear cup cushion 331. When the rear compression sensor trigger 340 containing the compression sensor cap 341 is not compressed, the electrical circuit with PCB 332 may remain open.

When the first front electrically conductive connector 374 and the second rear electrically conductive connector 375 of the rear compression triggered electrical connection in an embodiment may be operatively coupled to the PCB 332. In an embodiment, the PCB 332 may supply an electrical current to the first front electrically conductive connector 374, which may deliver electrical current to the first front electrically conductive contact plate 372. When the front compression sensor trigger 360 containing the compression sensor cap 361 is not compressed, it is not in electrically conductive contact between the first front electrically conductive contact plate 372 and the second front electrically conductive contact plate 373 via pogo connectors 362 and 363. Electrical current then is not delivered to the second front electrically conductive connector 375, and back to the PCB 332 and the electrical circuit is open. The PCB 332 in an embodiment is not triggered to deliver power to a speaker, microphone, or other headset components housed within the ear cup housing the ear cup cushion 331. When the front compression sensor trigger 360 containing the compression sensor cap 361 is not compressed, the electrical circuit with PCB 332 may remain open in an embodiment.

In such a way, the compression triggered headset power saving system may conserve power supplied to a speaker, microphone, or other headset components of the audio headset by only supplying power to the speaker, microphone, or other headset components when one or more compression sensor triggers housed within earcup cushion of the audio headset are compressed. When the front and rear compression sensor triggers are not compressed this indicates that the headset is not in use by a wearer, and no power is supplied. The method for conserving power supplied to a speaker, microphone, or other headset components of the audio headset with compression sensor triggers housed within earcup cushions of the audio headset may then end.

The blocks of the flow diagram of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A compression triggered headset power saving system for an audio headset comprising:

a first compression sensor cap operatively coupled to a first spring switch housed within a first compression sensor sleeve to form a first compression sensor trigger, such that movement of the first compression sensor cap toward the first compression sensor sleeve causes the first compression sensor cap to electrically contact a first pogo electrical contact, to urge the first pogo electrical contact into contact with a first electrical contact plate, and contacts a second electrical pogo contact to urge it into contact with a second electrical contact plate;

the first electrical contact plate and the second electrical contact plate mounted to an outer surface of an ear cup plate and operatively coupled to a printed circuit board (PCB) and a speaker; and the first compression sensor trigger disposed within a first ear cup cushion mounted to an inner surface of the ear cup plate such that movement of the first compression sensor cap to engage a first plurality of pogo electrical contacts that includes the first electrical pogo contact and the second electrical pogo contact occurs under compression of the first ear cup cushion to close a first circuit of the first compression sensor trigger to the PCB to trigger providing power to the speaker.

2. The compression triggered headset power saving system of claim 1 further comprising:

the first spring switch biased to push the first compression sensor cap away from the first plurality of pogo electrical contacts and the first compression sensor sleeve and out of electrically conductive contact with the first electrical contact plate and the second electrical contact plate when the first ear cup cushion is decompressed as the audio headset is removed from a user's head.

3. The compression triggered headset power saving system of claim 1 further comprising:

the first spring switch biased to push the first compression sensor cap away from the first compression sensor sleeve when the first ear cup cushion is decompressed as the audio headset is removed from a user's head and electrically decouple the PCB.

4. The compression triggered headset power saving system of claim 1 further comprising:

a third electrical contact plate and a fourth electrical contact plate mounted to the outer surface of the ear cup plate and operatively coupled between the PCB and a second compression sensor trigger; and the second compression sensor trigger disposed within the ear cup cushion such that movement of a second compression sensor cap into electrical contact with a second plurality of compression sensor pogo electrical contacts in a second compression sensor sleeve of the second compression sensor trigger under compression of the ear cup cushion closes a second circuit of the second compression sensor trigger to the PCB to trigger providing power delivery to the speaker.

5. The compression triggered headset power saving system of claim 1 further comprising:

the outer surface of the ear cup plate mounted to a first ear cup cover enclosing the PCB and speaker to form a first ear cup assembly; and the first ear cup assembly operatively coupled to a second ear cup assembly via a clamping headband biased to provide a clamping force pushing the first ear cup assembly and the second ear cup assembly toward a wearer's head.

6. The compression triggered headset power saving system of claim 1 further comprising:

the PCB, the speaker, the first electrical contact plate, and the second electrical contact plate housed within a sound chamber mounted to the ear cup plate.

7. The compression triggered headset power saving system of claim 1, wherein the first compression sensor cap has an electrically conductive inner surface to engage the first plurality of pogo electrical contacts.

8. A method of manufacturing a compression triggered headset power saving system in a first earcup assembly of an audio headset comprising:

operatively coupling a first compression sensor cap to a first spring switch housed within a first compression sensor sleeve to form a first compression sensor trigger, wherein movement of the first compression sensor cap toward the first compression sensor sleeve causes the first compression sensor cap to electrically contact a first pogo electrical contact to urge the first pogo electrical contact outside an edge of the first compression sensor sleeve and into contact with a first electrical contact plate and contacts a second electrical pogo contact to urge the second electrical pogo contact into contact with a second electrical contact plate;

biasing the first spring switch to push the first compression sensor cap away from a first plurality of pogo electrical contacts that includes the first electrical pogo contact and the second electrical pogo contact inside of the first compression sensor sleeve and decouple electrically conductive contact with the first electrical contact plate and the second electrical contact plate when the ear cup cushion is decompressed as the audio headset is removed from a user's head;

mounting the first electrical contact plate and the second electrical contact plate to an outer surface of an ear cup plate;

operatively coupling the first electrical contact plate and the second electrical contact plate to a printed circuit board (PCB) and a speaker; and disposing the first compression sensor trigger within a first ear cup cushion mounted to an inner surface of the ear cup plate to form the first earcup assembly, wherein movement of the first compression sensor cap to engage a first plurality of pogo electrical contacts that includes the first electrical pogo contact and the second electrical pogo contact occurs under compression of the first ear cup cushion to close a first circuit of the first compression sensor trigger to the PCB to trigger providing power to the speaker.

9. The method of claim 8 further comprising:

biasing the first spring switch to push the first compression sensor cap away from the first compression sensor sleeve when the ear cup cushion is decompressed as the audio headset is removed from a user's head.

10. The method of claim 8, wherein a wired connection to an information handling system supplies power to the PCB.

11. The method of claim 8 further comprising:

mounting a third electrical contact plate and a fourth electrical contact plate to the outer surface of the ear cup plate;

operatively coupling the third electrical contact plate and the fourth electrical contact plate to between the PCB and a second compression sensor trigger; and the second compression sensor trigger disposed within the ear cup cushion such that movement of a second compression sensor cap into electrical contact with a second plurality of compression sensor pogo electrical contacts in a second compression sensor sleeve of the second compression sensor trigger under compression of the ear cup cushion closes a second circuit of the second compression sensor trigger to the PCB to trigger providing power delivery to the speaker.

12. The method of claim 8 further comprising:

mounting the outer surface of the ear cup plate to a first ear cup cover enclosing the PCB and the speaker to form the first ear cup assembly; and operatively coupling the first ear cup assembly to a second ear cup assembly via a clamping headband biased to provide a clamping force pushing the first ear cup assembly and the second ear cup assembly toward a wearer's head.

13. The method of claim 8 further comprising:

housing the PCB, the speaker, and the first compression triggered electrical connection within a sound chamber mounted to the ear cup plate.

14. The method of claim 8, wherein a battery supplies power to the PCB.

15. A compression triggered headset power saving system for an audio headset comprising:

a first compression sensor cap operatively coupled to a first spring switch housed within a first compression sensor sleeve to form a first compression sensor trigger, such that movement of the first compression sensor cap toward the first compression sensor sleeve causes the first compression sensor cap to electrically contact a first pogo electrical contact, to urge the first pogo electrical contact into contact with a first electrical contact plate, and contacts a second electrical pogo contact to urge the second electrical pogo contact into contact with a second electrical contact plate;

a second compression sensor cap operatively coupled to a second spring switch housed within a second compression sensor sleeve to form a second compression sensor trigger, such that movement of the second compression sensor cap toward the second compression sensor sleeve causes the second compression sensor cap to electrically contact a third pogo electrical contact, to urge the third pogo electrical contact into contact with a third electrical contact plate, and contacts a fourth electrical pogo contact to urge the fourth electrical pogo contact into contact with a fourth electrical contact plate;

the first electrical contact plate, the second electrical contact plate, the third electrical contact plate, and the fourth electrical contact plate mounted to an outer surface of an ear cup plate and operatively coupled to a printed circuit board (PCB) and a speaker; and the first compression sensor trigger and the second compression sensor trigger disposed within a first ear cup cushion mounted to an inner surface of the ear cup plate such that movement of the first compression sensor cap to engage the first electrical pogo contact and the second electrical pogo contact occurs under compression of the first ear cup cushion to close a first circuit of the first compression sensor trigger to the PCB, and movement of the second compression sensor cap to engage the third electrical pogo contact and the fourth electrical pogo contact occurs under compression of the first ear cup cushion to close a second circuit of the second compression sensor trigger to the PCB; and the PCB to trigger providing power to the speaker when either the first circuit to the PCB or the second circuit to the PCB is closed.

16. The compression triggered headset power saving system of claim 15 further comprising:

the first spring switch biased to push the first compression sensor cap away from the first compression sensor sleeve and a first plurality of pogo electrical contacts including the first pogo electrical contact and the second pogo electrical contact, such that electrically conductive contact with the first electrical contact plate and the second electrical contact plate is ceased and the first circuit is open when the ear cup cushion is decompressed as the audio headset is removed from a user's head.

17. The compression triggered headset power saving system of claim 15 further comprising:

the second spring switch biased to push the second compression sensor cap away from the second compression sensor sleeve and a second plurality of pogo electrical contacts including the third pogo electrical contact and the fourth pogo electrical contact, such that electrically conductive contact with the third electrical contact plate and the fourth electrical contact plate is ceased and the second circuit is open when the ear cup cushion is decompressed as the audio headset is removed from a user's head.

18. The compression triggered headset power saving system of claim 15, wherein the first compression sensor cap includes an electrically conductive inner surface to engage the first pogo electrical contact and the second pogo electrical contact.

19. The compression triggered headset power saving system of claim 15 further comprising:

the outer surface of the ear cup plate mounted to a first ear cup cover enclosing the PCB, and the speaker to form a first ear cup assembly; and the first ear cup assembly operatively coupled to a second ear cup assembly via a clamping headband biased to provide a clamping force pushing the first ear cup assembly and the second ear cup assembly toward a wearer's head and compressing the first ear cup cushion.

20. The compression triggered headset power saving system of claim 15 further comprising:

the PCB, the speaker, the first electrical contact plate, and the second electrical contact plate housed within a sound chamber mounted to the ear cup plate.

* * * * *